United States Patent [19]
Murai et al.

[11] Patent Number: 5,771,164
[45] Date of Patent: Jun. 23, 1998

[54] POWER SUPPLY CONVERTER FOR SUPPRESSING HIGHER HARMONICS TO OUTPUT A STABLE VOLTAGE

[75] Inventors: Yoshihiro Murai, Seki; Junichi Takayama, Saya, both of Japan

[73] Assignee: Kabushiki Kaisha Meidensha, Tokyo, Japan

[21] Appl. No.: 750,861

[22] PCT Filed: Jul. 5, 1996

[86] PCT No.: PCT/JP96/01879

§ 371 Date: Jan. 6, 1997

§ 102(e) Date: Jan. 6, 1997

[87] PCT Pub. No.: WO97/03494

PCT Pub. Date: Mar. 1, 1997

[30] Foreign Application Priority Data

| Jul. 11, 1995 | [JP] | Japan | 7-173827 |
| Oct. 20, 1995 | [JP] | Japan | 7-272339 |
| Feb. 14, 1996 | [JP] | Japan | 8-026457 |

[51] Int. Cl.$^6$ .......................... H02M 7/155; G05F 1/613
[52] U.S. Cl. .............................. 363/89; 323/222
[58] Field of Search .................... 323/207, 222, 323/266, 281, 284, 299, 301; 363/80, 81, 89, 143, 101, 39

[56] References Cited

U.S. PATENT DOCUMENTS

| 4,719,552 | 1/1988 | Albach et al. | 363/44 |
| 5,245,522 | 9/1993 | Kawaguchi et al. | 363/37 |
| 5,489,837 | 2/1996 | Arakawa | 323/207 |
| 5,517,399 | 5/1996 | Yamauchi et al. | 363/89 |
| 5,532,528 | 7/1996 | Lammers | 307/125 |
| 5,602,465 | 2/1997 | Clemente | 323/300 |
| 5,638,265 | 6/1997 | Gabor | 363/89 |

*Primary Examiner*—Adolf Berhane
*Attorney, Agent, or Firm*—Foley & Lardner

[57] ABSTRACT

A converter includes a rectifier 1 of the diode bridge connected across the alternating current power supply via an input filter F; a circuit 2 having an reactor $L_1$, switching element Tr1, and the reverse current flow blocking diode $D_1$ connected across output terminals of the diode bridge; a smoothing capacitor Cd charged according to an energy stored in the reactor $L_1$; and a controller 3 arranged having a comparator 36 for comparing a signal of circuits 31 through 34 which detects a difference between the direct current output voltage Vd and the set (reference) voltage Vs and amplifies thereof with a triangular carrier wave 36 so as to control the transistor Tr1, the transistor Tr1 being controlled to be turned on or off according to the carrier wave frequency. When the transistor Tr1 is turned to ON, the energy is stored in the reactor L1 via the rectifier of the diode bridge 1. When the transistor Tr1 is turned to OFF, the capacitor Cd is charged according to the energy stored in the reactor $L_1$. The current in the element Tr1 flows therethrough when the input voltage is low irrespective of the voltage across the capacitor Cd so that the input current provides the sinusoidal wave.

16 Claims, 42 Drawing Sheets

HIGHER HARMONICS OF INPUT CURRENT

INPUT CURRENT WAVEFORM

EACH VOLTAGE AND CURRENT WAVEFORMS

VOLTAGE AND CURRENT WAVEFORM OF S1

OUTPUT SECTION EQUIVALENT CIRCUIT

INPUT FILTER SECTION EQUIVALENT CIRCUIT

EXPLANATION OF MODES

INPUT CURRENT WAVEFORM

VOLTAGE AND CURRENT WAVEFORM OF S2

VOLTAGE AND CURRENT WAVEFORM OF S1a

INPUT CURRENT WAVEFORM

VOLTAGE AND CURRENT WAVEFORM OF S1a

VOLTAGE AND CURRENT WAVEFORM OF S2

OPERATION MODE

CURRENT WAVEFORM OF EACH SECTION

INPUT CURRENT WAVEFORM

INPUT CURRENT WAVEFORM

INPUT CURRENT WAVEFORM

POWER SUPPLY CONVERTER FOR SUPPRESSING HIGHER HARMONICS TO OUTPUT A STABLE VOLTAGE

SPECIFICATION

1. Technical Field

The present invention relates to a converter which can suppress higher harmonic currents flowing through an alternating current power supply in a power rectifier which converts the alternating current power supply to a direct current power supply.

2. Background of the Invention

As rectifying and smoothing circuits such as those used in general purpose inverters, capacitor input-type rectifying and smoothing circuits have commonly been used.

FIG. 44 shows a single-phase alternating current inputted capacitor input type rectifier and FIG. 47 shows a three-phase alternating current inputted capacitor input type rectifying and smoothing circuit.

In FIGS. 44 and 47, RF denotes a rectifier of a diode bridge type, A denotes an in-rush (rush-in) current preventive circuit, and C denotes a smoothing capacitor.

The conventional capacitor input-type rectifying and smoothing circuits have advantages such as (1) less number of parts, (2) simple in circuit construction; and (3) no need to control the converter.

Hence, this type of converter is cost effective and finds its use in a general rectifying and smoothing circuit not only limited into the general-purpose inverter.

FIG. 50 shows, for example, another type of converter which is provided with self arc extinguishing type switching elements, expect the above-described capacitor input type rectifying and smoothing circuit.

In FIG. 50, 101 and 103 denote converter and inverter constituted by the switching elements Tr and diodes D and by the same, respectively. In addition, 102 denotes a control circuit section, F denotes a carrier wave eliminating filter and Cd denotes a smoothing capacitor. The control circuit section 102 makes a direct current voltage Vd constant and controls the switching elements Tr in the converter 101 so as to form a system power supply current Is in a sinusoidal waveform using each of detection signals of a power supply voltage Vi, a converter current Ic, a direct current Id, and a load current $I_L$ detected by means of the power transformer and current transformers PT1 and CT1 through CT3 in FIG. 50.

Since the rectifying and smoothing circuits of FIGS. 44 and 47 cause the current to flow therethrough when the input voltage is higher than the direct current voltage Vd although the input waveform of the rectifying and smoothing circuit is varied according to an impedance condition of the power supply, the input waveforms of FIGS. 44 and 47 are generally shown in FIGS. 45 and 48.

These input waveforms are frequency spectrum analyzed and FIGS. 46 and 49 show results of the frequency spectrum analysis in which large lower-order higher harmonic currents flow respectively.

Such higher harmonic currents as described above flow through the power supply system so that overheating or burning-out of a system phase-lead capacitor and a DC reactor would occur.

On the other hand, the other type of converter shown in FIG. 50 can effectively suppress the higher harmonic currents in the input current waveform. However, the control circuit section 102 of the converter 101 becomes complex and many signals such as the load current detection signal, the inverter current detection signal, DC voltage detector, and DC current detection signal are required. If these detection circuits are included in the control circuit section 102, a considerable cost would disadvantageously be needed to manufacture this type of the converter as a power inverter system.

SUMMARY OF THE INVENTION

It is an object of the present invention to provide a sinusoidal wave inputted converter which can suppress higher harmonic currents and output a stable direct current voltage with a simple control circuit, in view of the above-described problems of the conventional art.

The above-described object can be achieved by providing a single-phase sinusoidal wave inputted converter comprising: a rectifier of a diode bridge connected to a single phase power supply via an input filter; a transistor circuit having a switching element and a reactor connected in series with the switching element, one end of the switching element being connected to one end of said rectifier of the diode bridge and one end of the reactor being connected to the other end of said switching element and the other end of said reactor being connected to the other end of the rectifier of the diode bridge; a reverse current flow blocking diode arranged for passing only an energy stored in said reactor; a smoothing capacitor across of which the energy stored in said reactor is charged via said reverse current flow blocking diode; a control circuit having a reference voltage power supply, an amplifier arranged for amplifying a deviation between a voltage across the smoothing capacitor and the reference voltage, a carrier wave generator for generating a triangular carrier wave, a comparator arranged for comparing the amplified deviation with the triangular carrier wave so that a turn on or off of said switching element is controlled according to a result of the comparison.

Hence, when the switching element is controlled so as to be turned on or off, an energy is stored in the reactor during the turn on of the switching element and the smoothing capacitor is charged with the energy stored in the reactor during the turn off of the switching element. Since the switching element is controlled so that the voltage across the smoothing capacitor is made equal to the reference voltage, the stable output voltage can be achieved. In addition, since the input current flows even while the alternating current voltage is low, almost no lower-order higher harmonic current is present so as to provide the sinusoidal wave.

A pair of the transistor circuits may be installed in parallel to each other and each switching element may be controlled to be turned on or off according to comparison signals having 180° phase opposite to each other. In this case, ripple components in the input waveform due to the switching operations of the switching elements can be reduced.

The above-described object can also be achieved by providing a three-phase sinusoidal wave inputted converter comprising: a three-phase half-wave rectifier having a rectifying diode of each phase connected to a three-phase power supply via an input filter and connected in series with a first reactor; serial circuits each having a second rectifier and a switching elements and each being connected between an output terminal of the three-phase halfwave rectifier and an input end of each half-wave rectifier, reverse-current flow blocking diodes for passing energies stored in the first and second reactors; a smoothing capacitor across of which the energies stored in said first and second reactors are charged via the respective reverse-current flow blocking diodes; a reference voltage generator for generating a reference voltage; an amplifier for amplifying a deviation between the reference voltage and a voltage across the smoothing capacitor; a comparator for comparing the amplified deviation signal of the amplifier with a triangular carrier wave generated by a triangular carrier wave generator so that a turn on and off of each switching element is controlled according to a result of the comparison.

In this case, when the switching element is turned to ON, energies are stored in the first and second reactors. When the switching element is turned to OFF, the smoothing capacitor is charged with the energies stored in the first and second reactors.

The above-described object can also be achieved by providing a resonance-type sinusoidal wave inputted converter comprising: a three-phase or a single phase rectifier of a diode bridge connected to an alternating current power supply of a three phase or single phase via a filter; a self arc extinguishing type switching element connected between output terminals of the rectifier of the diode bridge; a serial circuit having a capacitor and a thyristor connected across output terminals of the rectifier of the diode bridge; a rectifier having a diode arranged for rectifying a terminal voltage across said capacitor and a smoother arranged for smoothing the rectifier output; and a control circuit arranged for outputting a first gate signal to a gate of said switching element at a frequency sufficiently higher than a power supply frequency and outputting a second gate signal to a gate of said thyristor at a timing of the output of the first gate signal to the gate of the switching element delayed by a predetermined time lag.

In this case, when the switching element is turned to ON, the energy is stored in the reactor of the input filter and, at a litter later time, the thyristor is turned to ON. Thereafter, when the switching element is turned to OFF, the energy in the reactor of the filter flows into the thyristor charging the first capacitor. When the first capacitor voltage becomes high, the rectifier is discharged charging the smoothing capacitor. When the thyristor is turned to OFF, the energy stored in the reactor charges the smoothing capacitor.

In place of the thyristor, the second switching element of the self arc extinguishing type may be used. In this case, the current flowing through the second switching element is detected by means of the hall CT. When the detection current is zero, a turn off signal is outputted so that the second switching element is operated in the same manner as the thyristor.

Alternatively, without detection of the current flowing through the second switching element, the first switching element is controlled to be turned on intermittently using the first gate signal and the second switching element is controlled to be turned on using the second gate signal which is turned to ON when the first gate signal is turned to ON and is, thereafter, turned to OFF and which is turned to OFF at a time after a predetermined delay when the first gate signal is turned to OFF.

The above-described object can also be achieved by providing a resonance-type sinusoidal wave inputted converter comprising: a three-phase or single phase rectifier of a diode bridge connected to an alternating current power supply of the three-phase or single phase via an input filter; a serial circuit having first, second, and third switching elements of self arc extinguishing types connected between output terminals of the rectifier of the diode bridge; a serial circuit having first and second capacitors connected in parallel to the first and second switching elements, respectively; a diode arranged for rectifying terminal voltages of the series connected first and second capacitors; a diode arranged for rectifying a terminal voltage across the series-connected first and second capacitors; a smoother arranged for smoothing the rectified output of the diode; and a control circuit arranged for turning on intermittently the first and second switching elements using a first gate signal, turning on the third switching element using a second gate signal which is turned on at the same time when the first gate signal is turned on and turning off the third switching element using the second gate signal which is turned off at a time delayed by a predetermined time after the first gate signal is turned off.

In this case, when the first, second, and third switching elements are turned to ON, the energies in the filter are stored in the reactor. When the first and second switching elements are turned to OFF, the energies stored in the reactor charge the first and second capacitors flowing into the third switching element. When the first and second capacitor voltages are higher than the smoothing capacitor voltage in the rectifier, the capacitor voltages are discharged into the rectifier charging the smoothing capacitor.

The above-described object can also be achieved by providing a resonance-type sinusoidal wave inputted converter comprising: a three-phase or single phase rectifier of a diode bridge connected to an alternating current power supply of a three-phase or single phase via an input filter; a serial circuit having first and second switching elements of self arc extinguishing types connected across an output terminal of the rectifier of the diode bridge; a serial circuit having first and second capacitors connected between output terminals of the rectifier of the diode bridge; a circuit arranged for connecting the first capacitor and the first switching element in parallel to each other; a diode arranged for rectifying a terminal voltage of the series-connected first and second capacitors; a smoother arranged for smoothing a rectified output of the diode; and a control circuit arranged for turning on intermittently the first and second switching elements using a first gate signal, turning on said third switching element using a second gate signal which is turned on while the first gate signal is turned on and thereafter turned off and which is turned off at a time delayed by a predetermined time after the first gate signal is turned off.

In this case, when the first and second switching elements are turned to ON, the energy is stored in the reactor of the filter. When the first and second switching elements are turned to OFF, the energy in the reactor of the filter flows into the third switching element charging the first and second capacitors. When the voltages across the first and second capacitors become higher than the voltage across the smoothing capacitor, the voltages across the rectifier are discharged into the rectifier charging the smoothing capacitor.

The above-described object can also be achieved by providing a resonance-type sinusoidal wave inputted converter comprising: a rectifier of a diode bridge connected to an alternating current power supply via an input filter; a second switching element of a self arc extinguishing type connected between output terminals of the rectifier of the diode bridge; a capacitor charged via a diode according to an output terminal voltage across the rectifier of the diode bridge; a second switching element of a self arc extinguishing type which outputs intermittently the voltage across said capacitor; a smoother arranged for smoothing an intermittent voltage from said second switching element; a circuit arranged for receiving a difference signal between an instruction value of the output voltage of the smoother and a detection value of the smoother output voltage and for controlling a duty ratio of a gate signal to be supplied to the first switching element; and a window type comparator arranged for receiving a difference signal between a target value of the capacitor and detected value of the capacitor and for outputting a gate signal to the second switching element.

In this case, when the first switching element is turned to ON, the energy is stored in the reactor of the filter. When the first switching element is turned to OFF, the energy stored in the reactor of the filter is charged into the capacitor via the diode. When the voltage across the capacitor reaches the target value, the second switching element is turned to ON in response to the output of the comparator so that the energy stored in the capacitor is discharged into the rectifier. The output voltage of the first switching element becomes constant since the duty ratio of the gate signal of the first switching element is controlled so that the output voltage is coincident with an instruction value thereof.

DESCRIPTION OF THE PREFERRED EMBODIMENTS

First Embodiment

Figure 1:
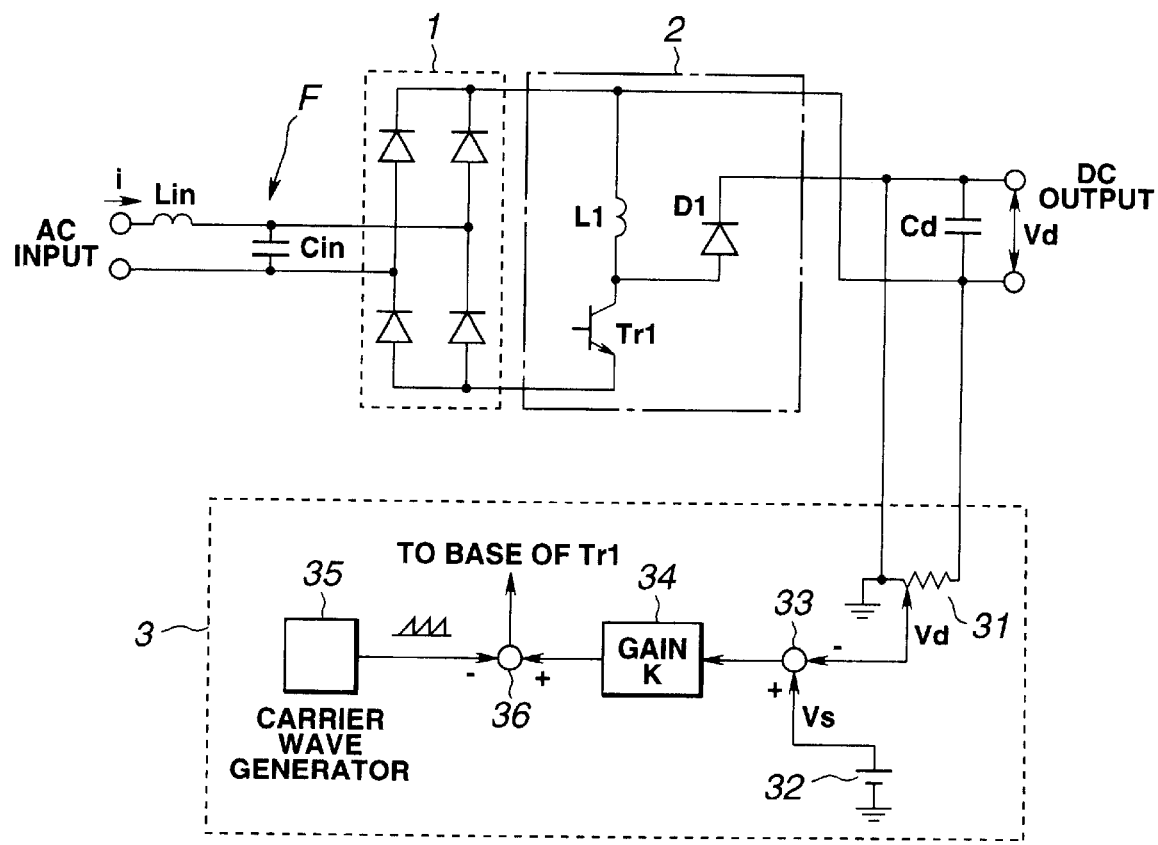
FIG. 1 is a circuit block diagram of a converter related to a first preferred embodiment according to the present invention.

FIG. 1 shows a single-phase sinusoidal wave inputted converter as a first embodiment. In FIG. 1, 1 denotes a rectifier of a diode bridge arranged for rectifying an alternating current of a single phase inputted through a carrier wave eliminating input filter F, 2 denotes a transistor circuit connected between output terminals of the rectifier 1 of the diode bridge. The circuit 2 includes a reactor $L_1$, a transistor Tr1 as a switching element, one end of the reactor $L_1$ being connected to a collector of the transistor Tr1, the other end of the inductor $L_1$ being connected to one output terminal of the rectifier 1 of the diode bridge, and an emitter of the transistor Tr1 being connected to the other output terminal of the rectifier 1 of the diode bridge, and a reverse flow blocking diode D1, a cathode of the diode D1 being connected to a junction between the reactor $L_1$ and the transistor Tr1 and an anode of the diode D1 being connected to a smoothing capacitor Cd as will be described later.

The reverse current flow blocking diode D1 serves to output a stored energy in the reactor $L_1$ to a capacitor Cd. The smoothing capacitor Cd is arranged for smoothing an output of the transistor circuit 2 and connected to the junction of the reactor $L_1$ and transistor Tr1 via the diode D1 and to the other end of the reactor $L_1$ in a form of a parallel connection.

In FIG. 1, a control circuit 3 is arranged for controlling a base current of the switching element Tr1 of the transistor circuit 2 and is provided with a voltage detector 31 detecting a direct current voltage Vd smoothed by means of the capacitor Cd, a reference voltage generator 32 for generating a reference voltage Vs, and a subtractor 33 arranged for deriving a deviation between the direct current output voltage and the reference voltage Vs, a PI (Proportion-Integration) amplifier 34 arranged for amplifying a deviation signal derived from the subtractor 33, and a carrier wave generator 35 arranged for outputting a triangular carrier wave of 5 KHz, and a comparator 36 arranged for controlling a base current of the switching element Tr1 of the transistor circuit 2 by comparing the output signals from the carrier wave generator 35 and the PI amplifier 34.

Next, an operation of the converter in the first embodiment will be described below.

The control circuit 3 derives a deviation between the direct current output voltage Vd detected by means of the voltage detector 31 and the reference voltage Vs, multiplies the deviation by a gain k of the PI amplifier 34, compares the gain multiplied deviation with the carrier wave of the carrier wave generator 35, determines an ON duration a of the switching element Tr1 of the circuit 2, and controls the base current of the switching element Tr1.

When the switching element Tr1 is turned on, an input energy is stored in the reactor $L_1$ via the input filter F and via the rectifier 1 of the diode bridge from the alternating current power supply. When the switching element Tr1 is turned off, the diode D1 is forward biased to be conducted so that the smoothing capacitor Cd is charged with the energy stored in the reactor L1. Since the turning on and off of the transistor Tr1 is carried out through the carrier wave of 5 KHz, the smoothing capacitor Cd is charged to a stable voltage.

Since the on duration of the switching element Tr1 is controlled so that a direct current output voltage Vd is coincident with a reference voltage Vs, the direct current output voltage Vd smoothed by means of the smoothing capacitor Cd is finally made coincident with the reference voltage Vs.

Figure 2:
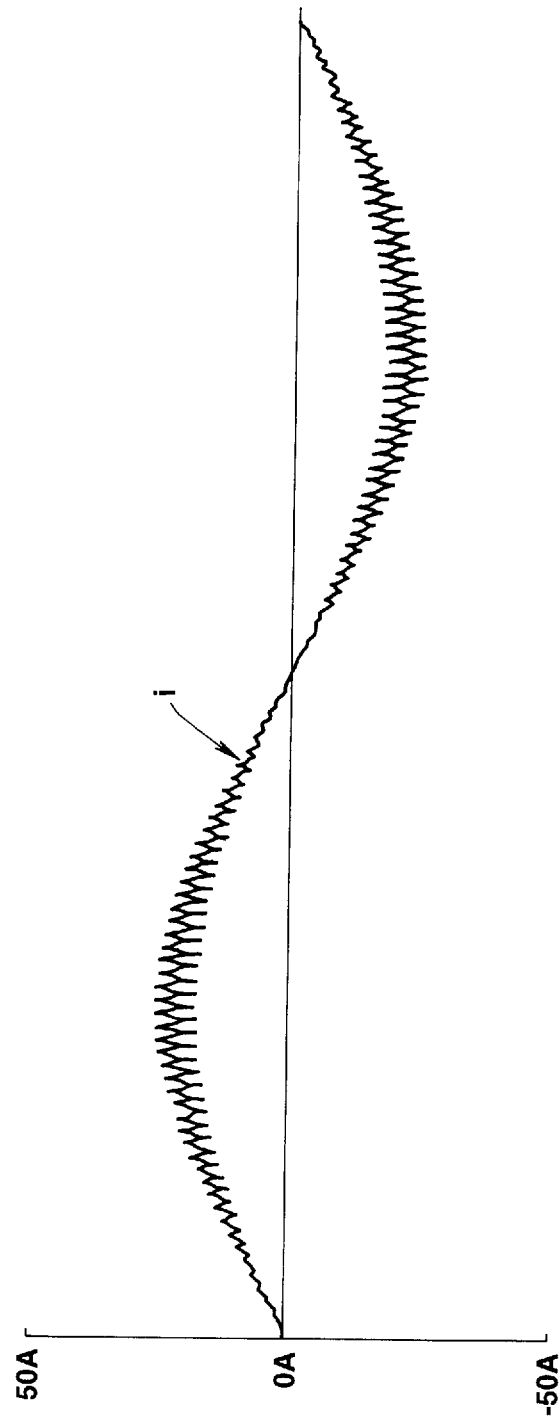
FIG. 2 is a waveform chart representing an input current of the converter.

In addition, when the switching element Tr1 is turned on; the input current flows even when the AC input voltage is low. Therefore, the lower-order higher harmonic current is suppressed. The input current waveform is shown in FIG. 2. It is noted that, in the first embodiment, the alternating current power supply is 100 volts and 50 Hz, Lin in the filter F is 1 mH, Cin is 10 $\mu$F, L1 is 100 $\mu$H, Cd is 200 $\mu$F, $R_L$ of a load is 5$\Omega$.

Figure 3:
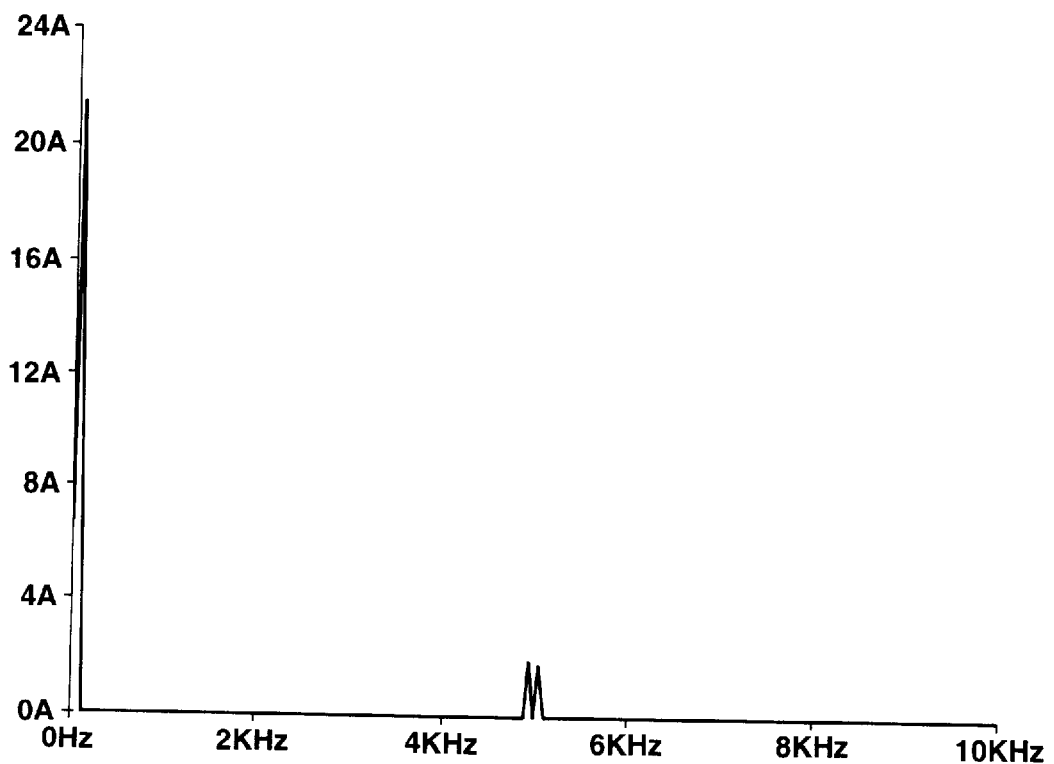
FIG. 3 is a waveform chart representing a higher harmonic of an input current.

When a spectrum analysis of the input current waveform shown in FIG. 2 was carried out, lower-order higher harmonic currents hardly flowed as shown in FIG. 3.

It is, however, noted that, as shown in FIG. 3, the higher harmonic currents having frequencies placed in the vicinity to the carrier wave frequency (5 KHz) appeared.

Second Embodiment

Figure 4:
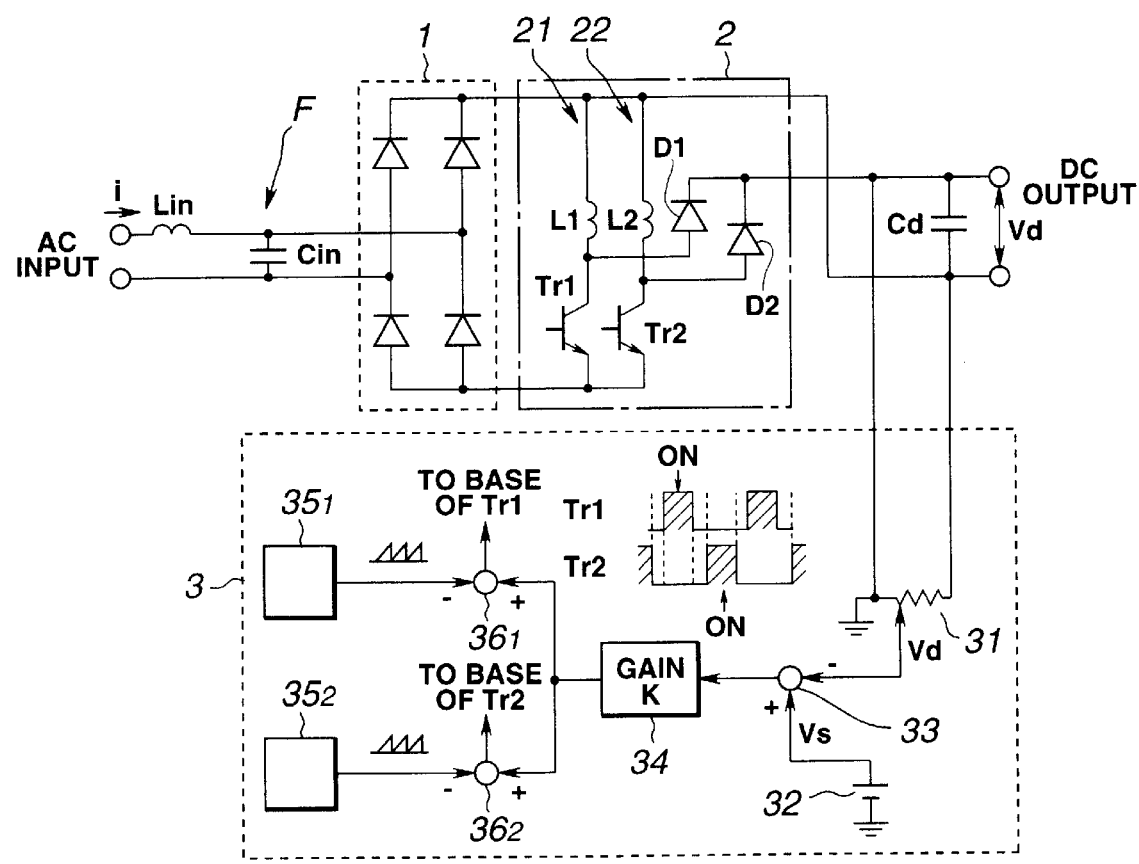
FIG. 4 is a circuit block diagram of a converter related to a second preferred embodiment according to the present invention.

FIG. 4 shows a second preferred embodiment of the converter for the single phase sinusoidal wave inputted type according to the present invention.

In FIG. 4, 1 denotes the rectifier of the diode bridge arranged for rectifying a single phase alternating current inputted through the carrier wave eliminating input filter F, and 2 denotes the transistor circuit connected between output terminals of the rectifier of the diode bridge 1. The transistor circuit 2 includes two circuits 21 and 22 connected in parallel to each other. Each circuit 21 (22) includes a series circuit having the reactor L1 (L2) and the transistor Tr1 (Tr2) and the reverse flow blocking diode D1 (D2) connected to the junction between the reactor L1 (L2) and switching element Tr1 (Tr2). Cd denotes the smoothing capacitor connected in parallel to the reactor L1 (L2) via the diode D1 (D2). A control circuit 3 is provided for controlling base currents of the switching elements Tr1 and Tr2 of the transistor circuit 2. The control circuit 3 includes a direct current voltage generator 31 detecting the direct current output voltage Vd; a voltage generator 32 setting the reference voltage Vs; a subtractor 32 arranged for subtracting the deviation between the voltages Vd and Vs; and the PI amplifier 34 arranged for amplifying the deviation signal; carrier wave signal generators $35_1$ and $35_2$ arranged for outputting two triangular carrier waves having a frequency of 5 KHz and having a mutually phase difference of 180 degrees; and comparators $36_1$ and $36_2$ driving the bases of the switching elements Tr1 and Tr2 by comparing these two carrier waves with the signals from the respective PI amplifiers 34 to drive the base currents of the switching elements Tr1 and Tr2.

As described above, the base drive signals of the switching elements Tr1 and Tr2 outputted from the comparators $36_1$ and $36_2$ have the same on duration a but have a phase difference therebetween by 180°. Therefore, since the switching elements of Tr1 and Tr2 are not turned on simultaneously, the switching elements of Tr1 and Tr2 are turned on alternatingly at the frequency of the carrier wave of 5 KHz.

Figure 5:
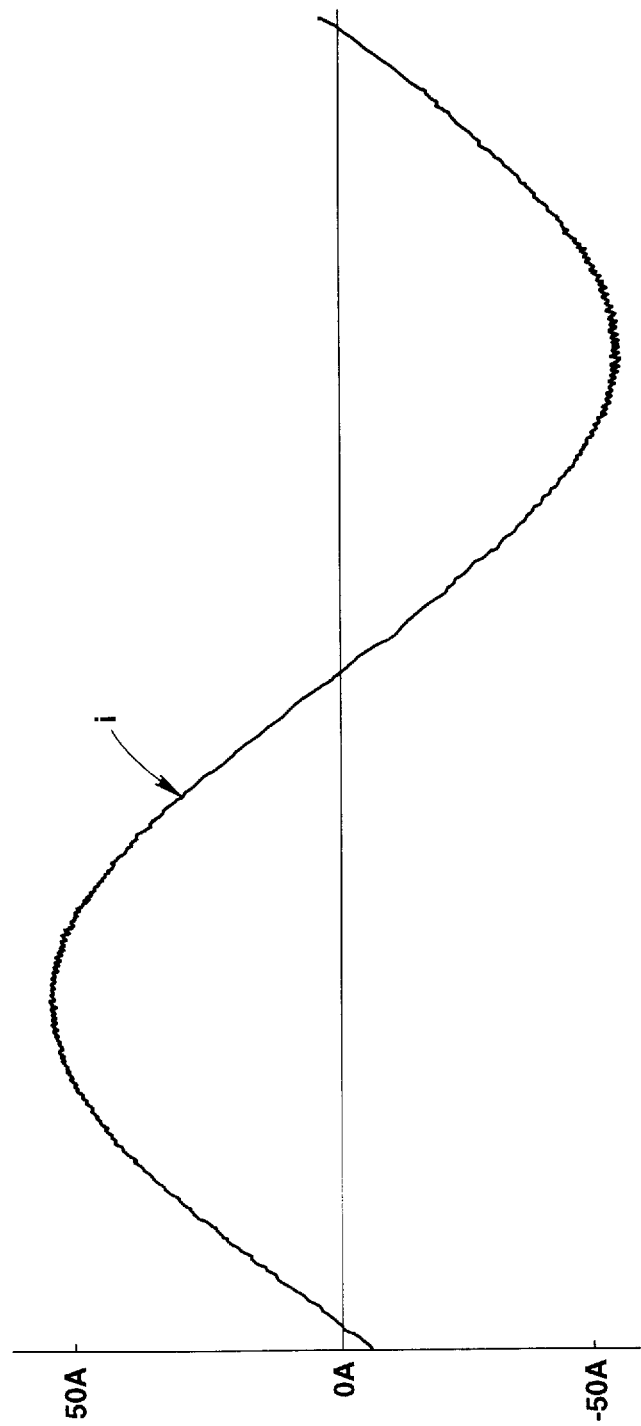
FIG. 5 is a waveform chart representing an input current of the converter shown in FIG. 4.

Hence, the converter in the second embodiment as shown in FIG. 4 indicated the input current waveform shown in FIG. 5. As appreciated from FIG. 5, the lower-order higher harmonics did not flow as seen from a conventional capacitor inputted type rectifier and ripple components caused by the switching operations of the switching elements were remarkably reduced.

Third Embodiment

Figure 6:
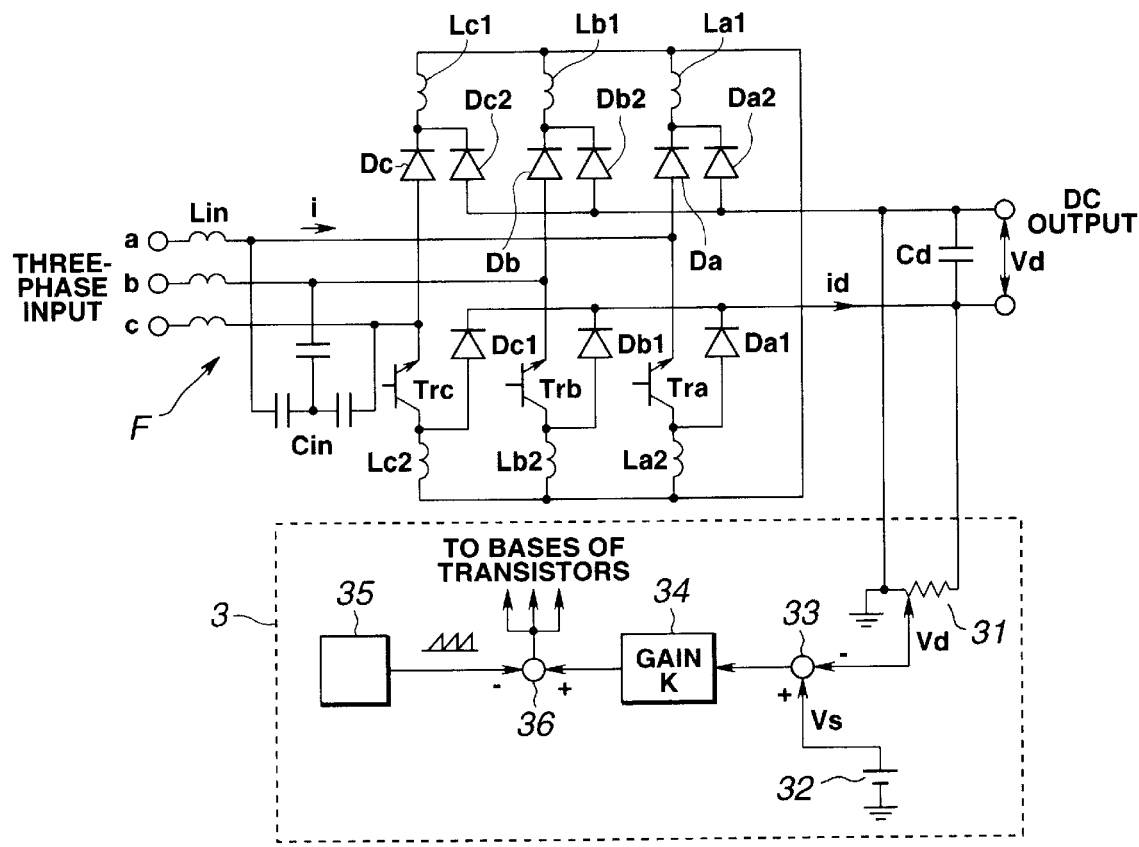
FIG. 6 is a circuit block diagram of a converter related to a third preferred embodiment according to the present invention.

FIG. 6 shows a three-phase sinusoidal wave inputted converter in a third preferred embodiment. In FIG. 6, F denotes the carrier wave eliminating input filter, Da through Dc denote diodes of the rectifier of the diode bridge constituting a three-phase half-wave rectifier, La1 through Lc1 denote first reactors serially connected with the diodes Da through Dc, La2 through Lc2 and Tra through Trc denote second reactors and switching elements serially connected between the output terminals of the rectifier and the input terminals of each phase of the rectifier, Da1 through Dc1 and Da2 through Dc2 denote reverse flow blocking diodes arranged for outputting the energy stored in the first reactors and second reactors La1 and La2 through Lc2, and Cd denotes the smoothing capacitor connected between the diodes Da1 through Dc1 and Da2 through Dc2.

In FIG. 6, 3 denotes the control circuit arranged for controlling the base current of the switching elements Tra through Trc. The control circuit 3 includes a voltage generator 31 arranged for detecting a direct current voltage Vd, a voltage generator 32 arranged for generating the reference voltage Vs, a subtractor 32 arranged for deriving a deviation between the voltages Vd and Vs, an PI amplifier 34 arranged for amplifying the deviation signal between the voltages of Vd and Vs, the carrier wave generator 35 arranged for generating and outputting the triangular carrier wave of the frequency of 10 KHz, and the comparator 36 arranged for driving base currents of the switching elements Tra through Trc by comparing these carrier waves with the signals of the PI amplifier 34.

As described above, the switching elements Tra through Trc are turned on or off in response to the signal from the comparator 36.

Since one of each phase has the same structure as the other, the operation of the converter in FIG. 6 when the switching element Tra is turned on or off will be described below.

When the switching element Tra is turned on, a current flows through the second reactor La2 from the rectifying diodes Db through Dc via the first reactors Lb1 through Lc1 so that the energy is stored in these reactors. When the switching element Tra is turned off, the energies stored in the first reactors Lb1 through Lc1 and the second reactor La2 are charged into the capacitor Cd via the circuit constituted by the diodes Da1 and Db2 through Db2. This charging operation is carried out in the cases of the switching elements Trb and Trc in the other phases. In addition, a switching frequency is as high as 10 KHz of the carrier wave frequency. The direct current output voltage Vd is controlled so as to become equal to the reference voltage Vs, thus achieving the stable direct current output voltage.

The input current flows when the power supply voltage is relatively low when the switching element is turned on, almost all of the current of the lower-order higher harmonic currents do not flow.

Figure 7:
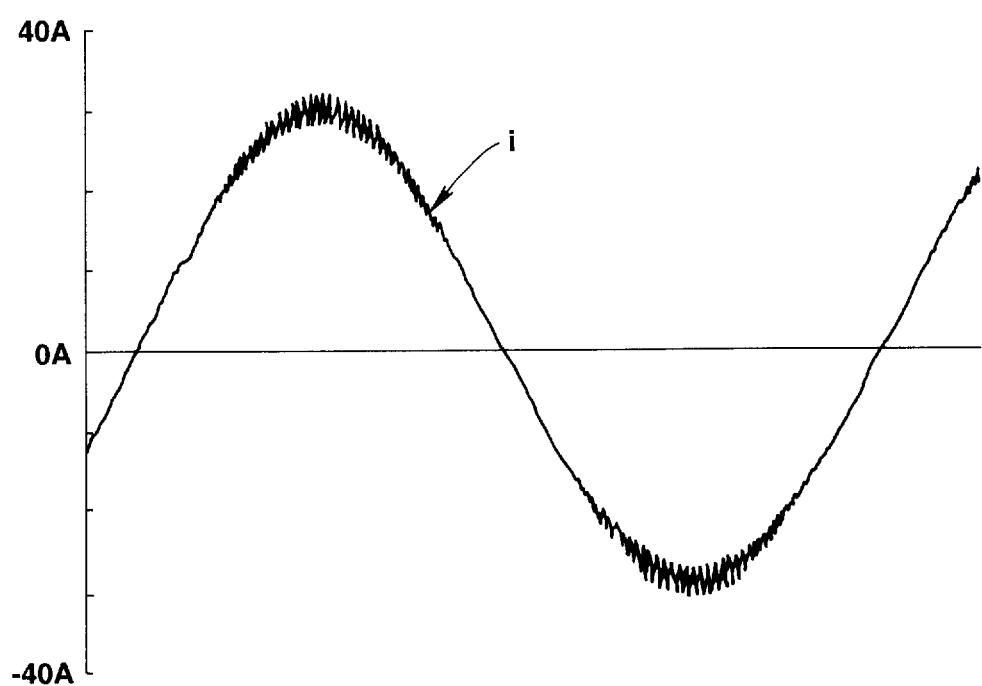
FIG. 7 is a waveform chart representing an input current of the converter shown in FIG. 6.

FIG. 7 shows the input current waveform of the three-phase sinusoidal wave inputted converter in the third embodiment. In this embodiment, AC power supply is 200 Volts, 60 Hz, Lin is 0.5 mH, Cin is 5 μF, La1 through Lc1 and La2 through Lc2 are 15 μH, Cd is equal to or below 2000 μF, and $R_L$ is 10Ω.

Fourth Embodiment

Figure 8:
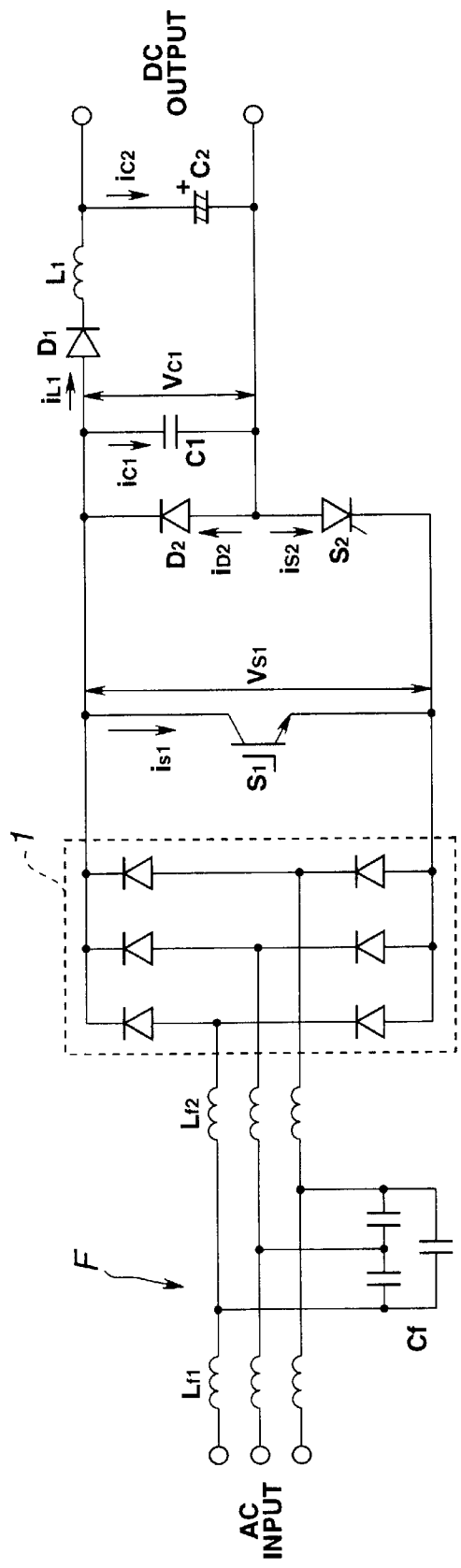
FIG. 8 is a circuit block diagram of a converter related to a fourth preferred embodiment according to the present invention.
Figure 9:
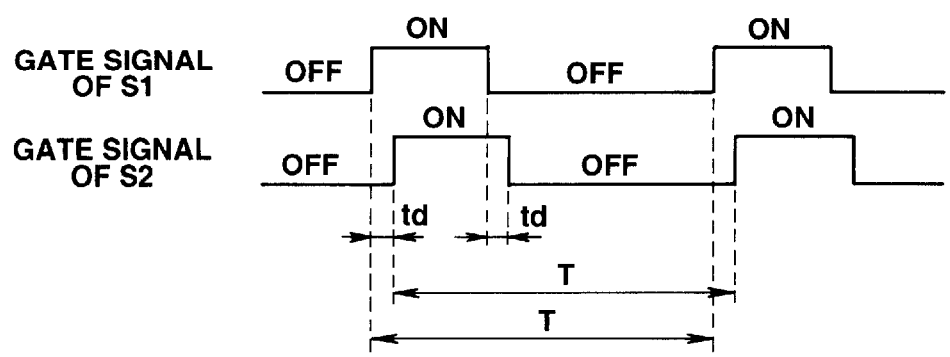
FIG. 9 is integrally a timing chart representing gate signals of switching elements S1 and S2 shown in FIG. 8.
Figure 10:
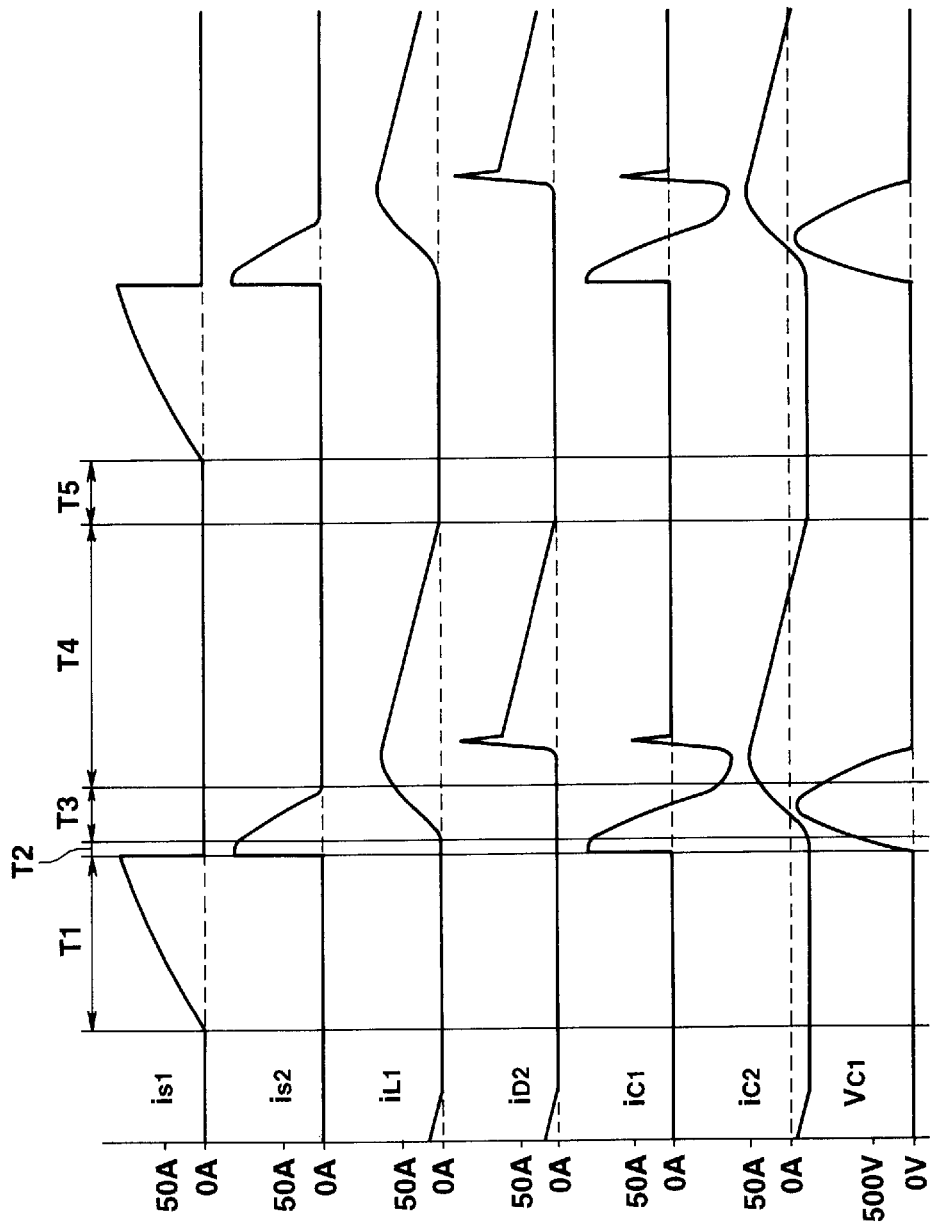
FIG. 10 is integrally a waveform chart of currents and voltages at respective parts of the converter.

FIG. 8 shows a fourth preferred embodiment of the three-phase sinusoidal wave inputted converter of the resonance type. In FIG. 8, Lf1 and Lf2 denote reactors inserted serially into the respective phases of the AC input power supply and Cf denotes a capacitor group, each capacitor being inserted between the respective phases of the three-phase AC input, these reactors Lf1 and Lf2 and capacitor group Cf constituting a three-phase input filter F. In FIG. 8, 1 denotes the rectifier of the three-phase diode, S1 denotes a switching element of IGBT (Insulated Gate Bipolar Transistor) connected between output terminals of the rectifier 1 of the diode bridge, $C_1$ denotes a capacitor serially connected with a thyristor $S_2$. A circuit of the capacitor $C_1$ and thyristor $S_2$ is inserted between the output terminals of the rectifier of the diode bridge 1, $D_2$ denotes a diode connected in parallel to the capacitor $C_1$ in a reverse direction so as to form a current loop with the capacitor $C_1$, $D_1$ denotes a diode arranged for rectifying a terminal voltage across the capacitor $C_1$, and $L_1$ and $C_2$ denote a reactor and an electrolytic capacitor arranged for smoothing an output voltage across the diode $D_1$. Gate signals are provided for the IGBT element $S_1$ and thyristor $S_2$, respectively. For the gate signal for the thyristor $S_2$, a signal a phase of which is delayed by a time $t_d$ with respect to the gate signal for the IGBT element $S_1$ is used. In the fourth embodiment, a period of each of the gate signals is T=100 μS (switching frequency 10 KHz) and the delay time td=2 μs. FIG. 10 shows waveform charts of each part of the converter shown in FIG. 8.

The operation of the converter in the fourth embodiment will be explained with reference to FIG. 10.

Interval T1: When the IGBT element $S_1$ is turned on in response to the gate signal, the AC power supply is short-circuited via the input filter F and rectifier of the diode bridge 1. At this time, when the current $i_{s1}$ flowing through the element $S_1$ flows through a conducted diode of the diodes of the rectifier of the diode bridge 1 determined according to a magnitude relationship between the line power supply voltage of each phase. Although the gate of the thyristor $S_2$ receives the on signal delayed by the time td with respect to the element $S_1$, no current flows through the thyristor $S_2$ since the short-circuited current $i_{s1}$ flows through the element $S_1$.

Interval T2: When the element $S_1$ is turned off, the current $i_{s2}$ starts to flow through the thyristor $S_2$ whose gate is turned on in response to the gate signal via the capacitor $C_1$.

Interval T3: The current $i_{s2}$ continues to flow through the thyristor $S_2$ until the energies stored in the reactors Lf1 and Lf2 are discharged during the ON interval of the element $S_1$. The current $i_{s2}$ flowing through the power supply to the thyristor $S_2$ flows charging ($i_{c1}$), at first, the capacitor $C_1$. The current ($i_{c1}$) is flowing as a load current through the reactor $L_1$ via the conducted diode $D_1$ since the voltage across the capacitor $C_1$ becomes higher than the voltage across the capacitor $C_2$ charging ($i_{c2}$) the capacitor $C_2$.

Interval T4: When the current $i_{s2}$ flowing through the thyristor $S_2$ becomes zero and the thyristor is turned off, a supply of the load current from the power supply is stopped. In this interval, the energy stored in the reactor $L_1$ charges ($i_{c2}$) the capacitor $C_2$ and supplies the load current. In addition, the current $i_{L1}$ by means of the reactor $L_1$ flows through the diode D2 upon the completion of the discharge ($-i_{c1}$) from the capacitor $C_1$.

Figure 11:
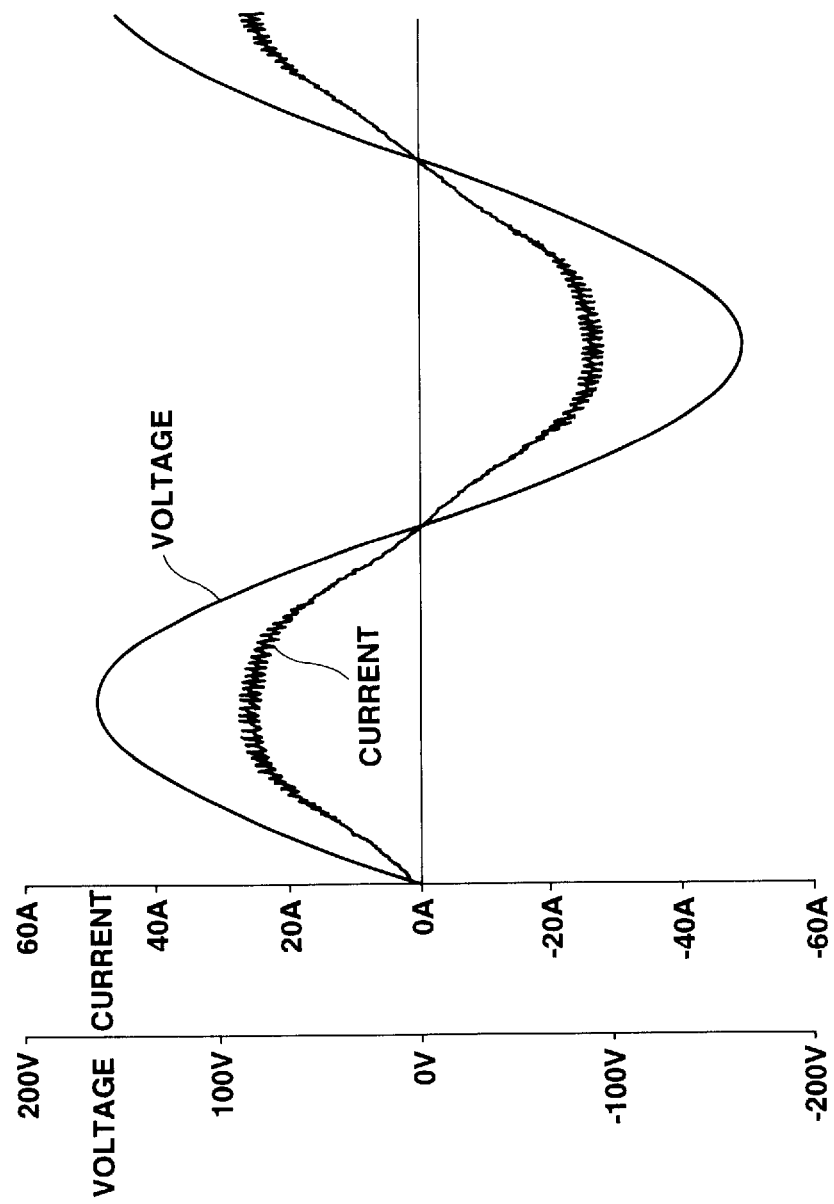
FIG. 11 is integrally a waveform chart of input voltage and current waveforms of the converter shown in FIG. 10.

Interval T5: The load current is constituted only by the diacharge current $-i_{c2}$ across the capacitor $C_2$. Since the converter is operated as described above, the input current flows in a substantially sinusoidal wave as shown in FIG. 11.

Figure 12:
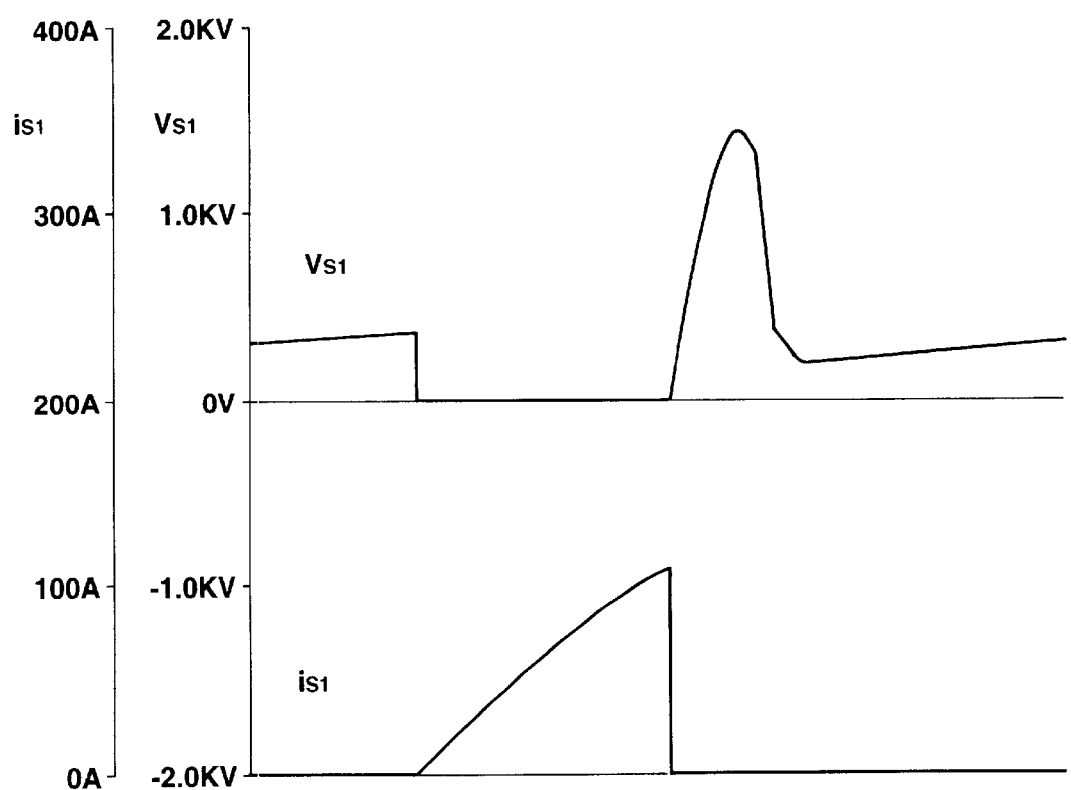
FIG. 12 is integrally a waveform chart of input voltage and current of the element S1.

FIG. 12 shows voltage and current during the switching operation of the IGBT element $S_1$. When the zero current flows through the IGBT element during the turn on thereof, a switching to turn off the IGBT element occurs as Zero Current Switching operation (ZCS operation). When the zero voltage is applied across the IGBT element $S_1$ during the turn off of the IGBT element, a switching to turn on the IGBT element $S_1$ occurs as Zero Voltage Switching operation (ZVS operation). Therefore, almost no loss in a switching operation occurs. Hence, a high efficient sinusoidal wave inputted converter can be achieved.

Fifth Embodiment

Figure 13:
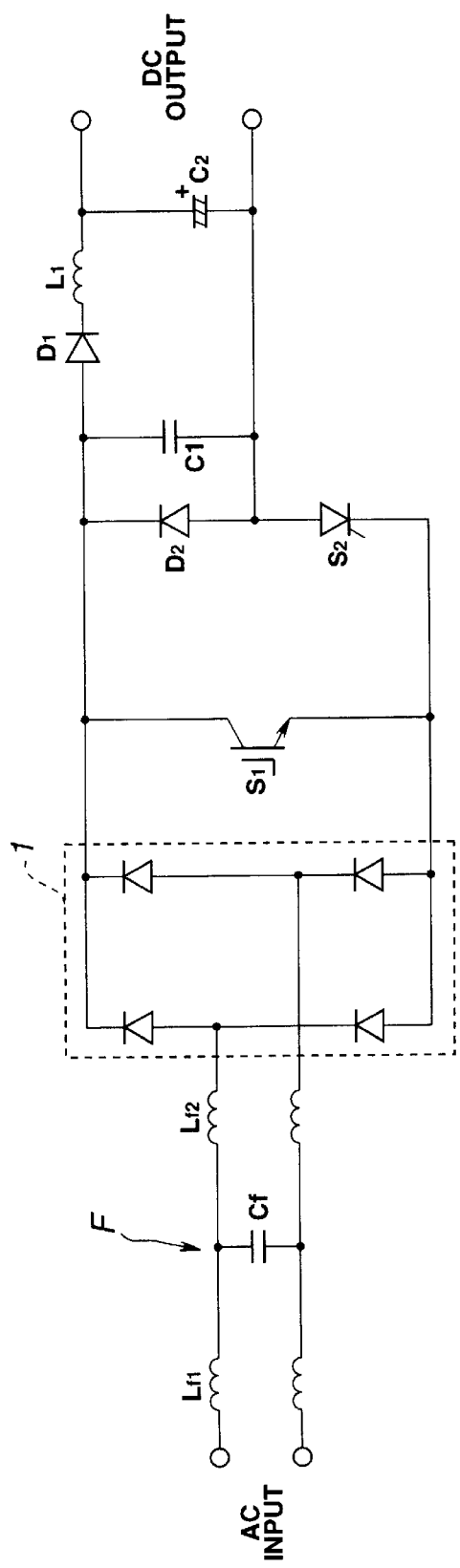
FIG. 13 is a circuit wiring diagram of a converter related to a fifth preferred embodiment according to the present invention.

FIG. 13 shows a single phase sinusoidal wave inputted converter of the resonance type in a fifth preferred embodiment according to the present invention.

The inverter shown in FIG. 13 includes the single-phase input filter F and the single-phase rectifier of the diode bridge 1 as are different from the three-phase converter of FIG. 8. The other structures are the same. Since the basic operation is the same as the three-phase converter of FIG. 8, the explanation of the converter will be omitted. Since the gate signals for the IGBT element $S_1$ and the thyristor $S_2$ are exactly the same as those in the case of the three phase of FIG. 8, the sinusoidal wave inputted converter can be achieved with the same structure of the three phase converter.

Sixth Embodiment

Figure 14:
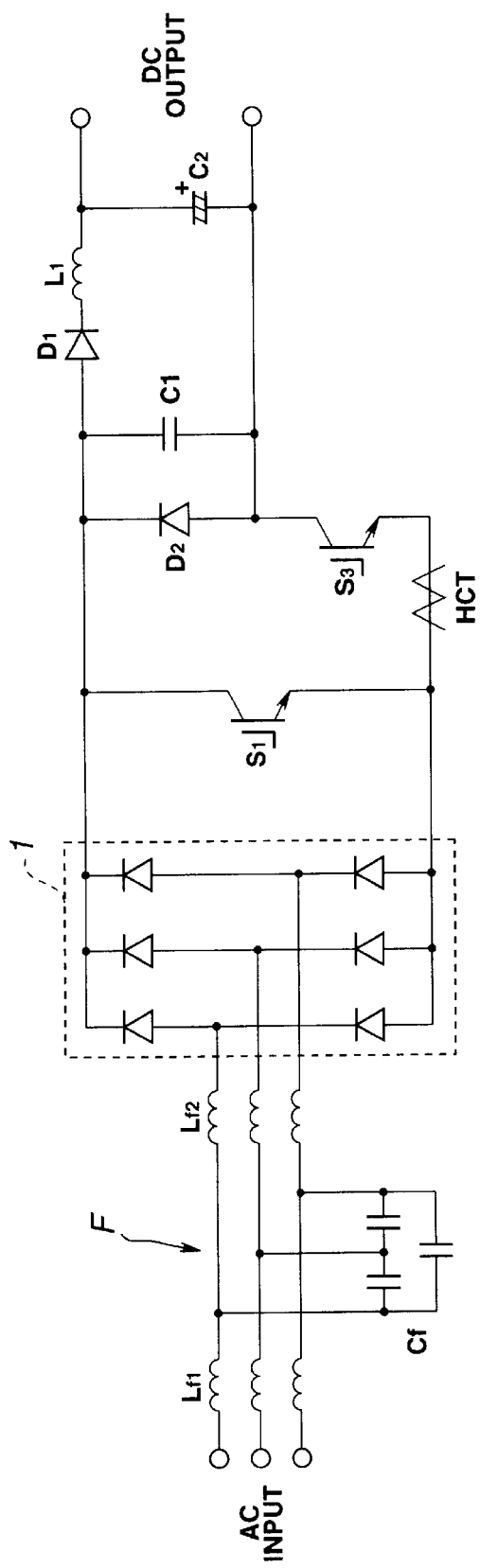
FIG. 14 is a circuit wiring diagram of a converter related to a sixth preferred embodiment according to the present invention.

FIG. 14 shows the three-phase sinusoidal wave inputted converter of the resonance type in a sixth embodiment.

In FIG. 14, in place of the thyristor $S_2$ of the converter shown in FIG. 8, a switching element $S_3$ of a self arc extinguishing type such as an IGBT element is used. Then, the current detector HCT such as a hall element current detector CT is provided for detecting the current flowing through the switching element. The other structure is the same as that shown in FIG. 8.

As far as the turn on of the gate signal of the switching element S3 is concerned, the same case applies equally well to that in the case of the switching element $S_2$. The turn off signal is outputted when the detection current of the current detector HCT gives zero. Since the switching element S3 is operated equally well to the thyristor $S_2$, the converter is operated equally well to the circuit shown in FIG. 8.

Seventh Embodiment

Figure 15:
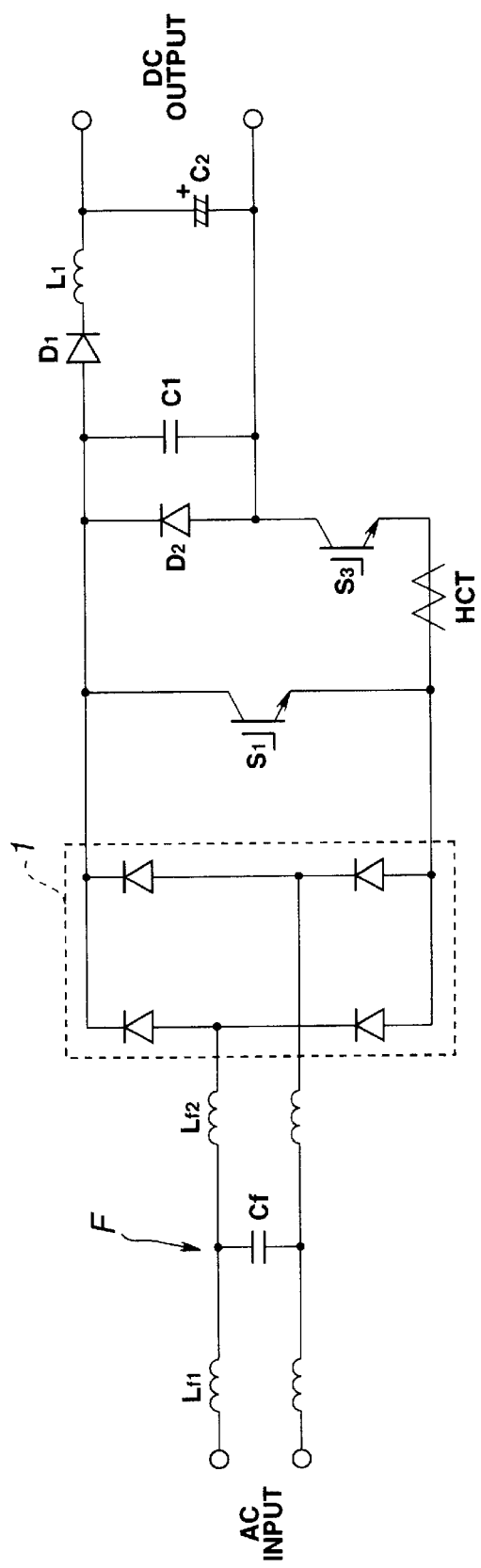
FIG. 15 is a circuit wiring diagram of a converter related to a seventh preferred embodiment according to the present invention.

FIG. 15 shows a seventh embodiment of the single phase sinusoidal wave inputted converter of the resonance type.

In the converter shown in FIG. 15, the switching element $S_3$ of the self arc extinguishing type is used in place of the thyristor $S_2$ shown in FIG. 14. in addition, the current detector HCT is provided so that the switching element $S_3$ is operated in the same way as the thyristor $S_2$.

Eighth Embodiment

Figure 16:
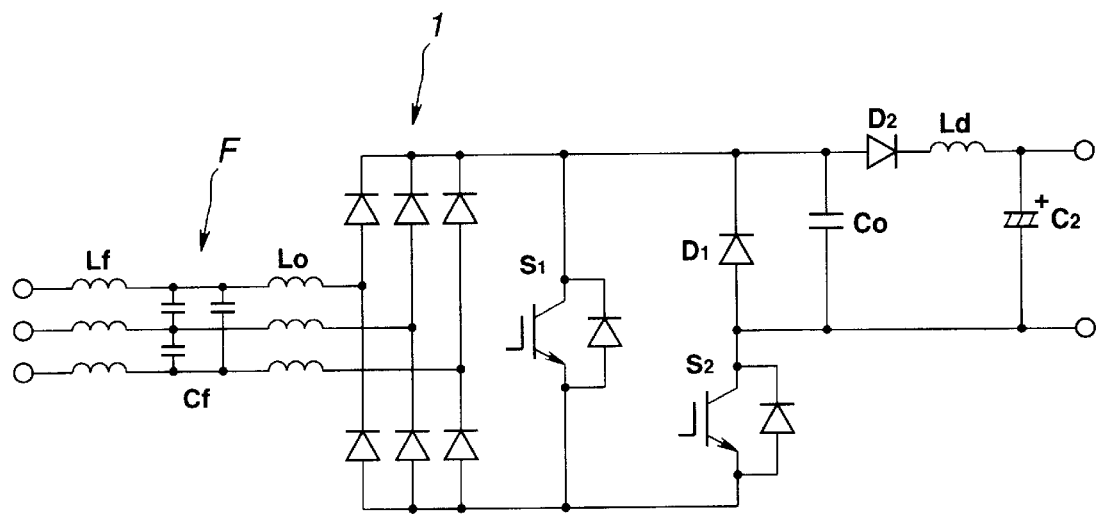
FIG. 16 is a circuit wiring diagram of a converter related to an eighth preferred embodiment according to the present invention.

FIG. 16 shows an eighth embodiment of the three-phase sinusoidal wave inputted converter of the resonance type. In FIG. 16, Lf and Lo denote reactors, Cf denotes the capacitor group, and these reactors and capacitor constituting the three-phase input filter F.

In FIG. 16, 1 denotes the three-phase rectifier of the diode bridge connected to the power supply via the input filter F, $S_1$ denotes the IGBT element connected between output terminals of the rectifier of the diode bridge 1, $C_0$ and $S_2$ denote the capacitor and IGBT element serially connected with each other between the output terminals of the rectifier 1 of the diode bridge, $D_1$ denotes a diode connected in parallel to the capacitor Co in a reverse direction so as to form a current loop. $D_2$ denotes a diode for rectifying the terminal voltage across the capacitor $C_0$, and Ld and $C_2$ denote the reactor and electrolytic capacitor arranged for smoothing the output voltage of the diode $D_2$.

Figure 17:
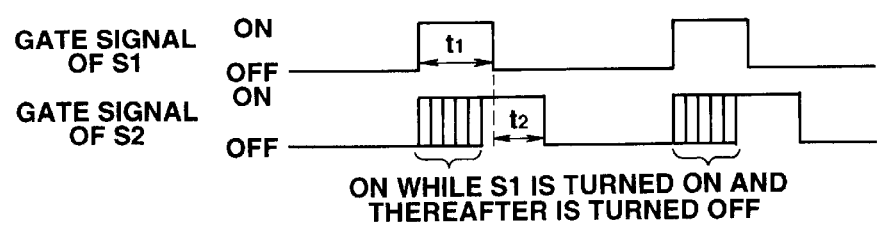
FIG. 17 is integrally a timing chart representing gate signals of the elements S1 and S2.

As shown in FIG. 17, the element $S_1$ is controlled with the gate signal having the ON duration of $t_1$. The element $S_2$ is turned to ON from a time at which the element $S_1$ is turned to ON to a time at which the element $S_1$ is turned to OFF and to OFF upon a time after the time of $t_2$ has passed from a time at which the element $S_1$ is turned to off. The problem to be solved hereat is the timing at which the element $S_2$ is turned to OFF. Since it is possible to derive the timing at which the element $S_2$ is turned to OFF (in actual practice, the timing is determined, at first, and the circuit constant is selected so as to achieve the function of the element $S_2$), the current detector HCT of FIG. 14 can be omitted. 25 Next, a selection method of the circuit element will be described below.

(1) Converter:

Switching modes of the converter shown in FIG. 16 are divided into three modes of A, B, and C. The mode A is such that the ON duration of the element $S_1$ is continued during the time $t_1$, the mode B is such that a charging operation in the capacitor $C_0$ is continued for the time $t_2$, and the mode C is such that a discharging from the capacitor $C_0$ is continued for the time of $t_3$. T: switching period, a: a control factor $(=t_1/T)$, $A_1 = \alpha T$, $t_2 = \alpha_2 T$, $t_3 = \alpha_3 T$.

Figure 20:
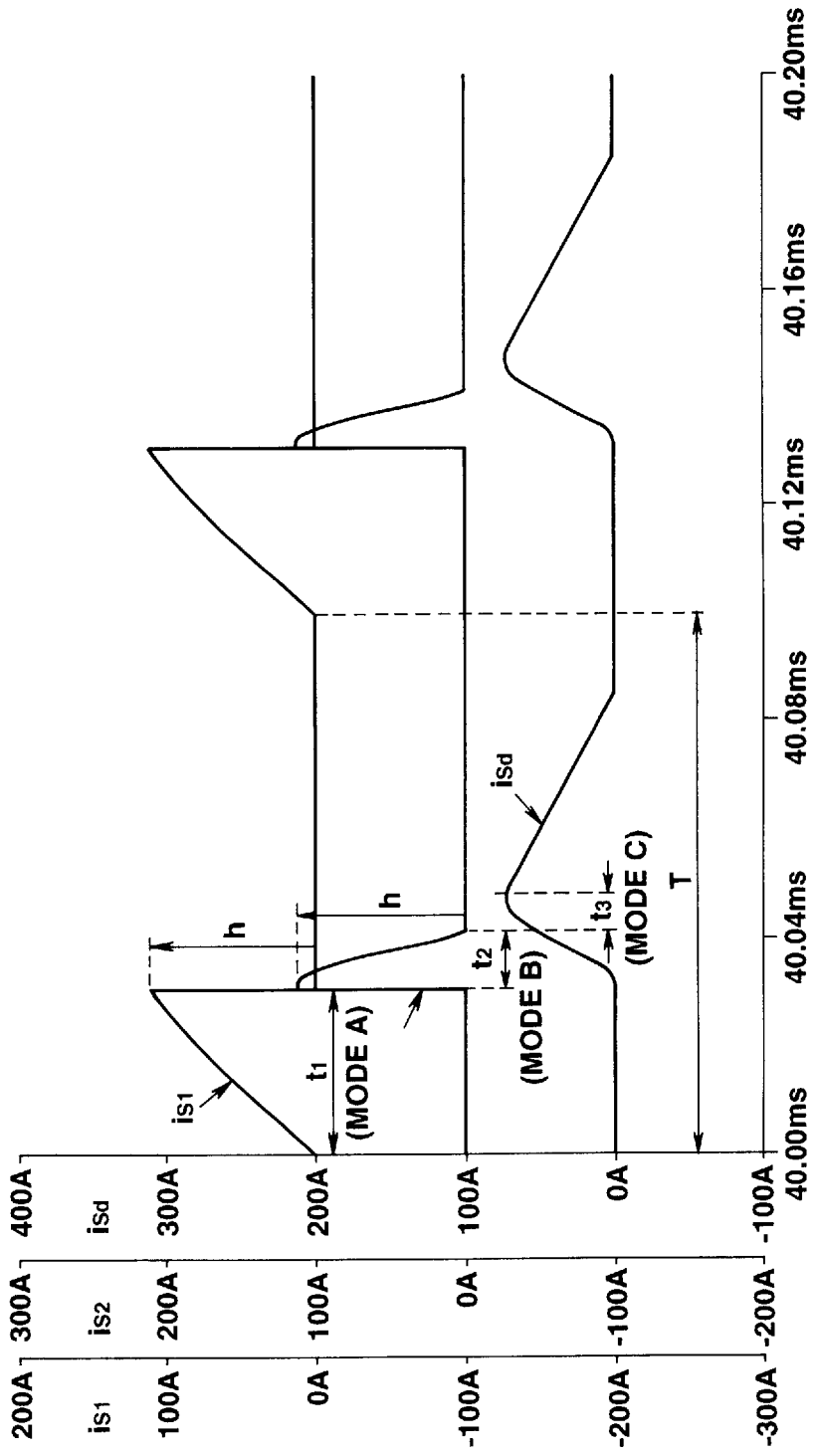
FIG. 20 is an explanatory view of operation modes of the converter.

Suppose that the output current Id (average value), switching period T, the control factors $\alpha, \alpha_2$, and $\alpha_3$, the output voltage Ed, and input voltage V (Inline effective value) are given. FIG. 20 shows a relationship between the times T, $t_1$, $t_2$, and $t_3$ and switching modes A, B, and C.

1) Mode A:

When the element $S_1$ is turned to ON, the current $i_{S1}$ flows through the equation (1).

$$i_{S1} = (V_{phase}/L_0) \cdot t \qquad (1),$$

wherein V phase: phase voltage equivalent dc value $(=\sqrt{(2/3)} \times V)$, a peak value h of the current $i_{s1}$ is derived from the equation (1) as follows:

$$\begin{aligned} h &= (V_{phase}/Lo) \cdot t_1 \\ &= 3/\pi \cdot 2/3 \cdot (V/Lo) \cdot t_1 \\ &= 0.78(V/L_o) \cdot t_1, \end{aligned} \qquad (2)$$

Hence, the electric charge $Q_1$ stored in the reactor Lo during the time $t_1$ is expressed in an equation (3).

$$Q_1 = (1/2) \cdot t_1 \cdot h \qquad (3).$$

2) Mode B:

When the element $S_1$ is turned off with the turn on of the element $S_2$, the capacitor $C_0$ is charged at the same time as the element $S_1$ is turned to OFF. This charge current $i_{S2}$ is supposed to be changed in a cosine form from the value equal to the peak value h of the current $i_{s1}$. At this time, the electric charge $Q_0$ stored in the capacitor $C_0$ during the time $t_2$ of the mode B is given as follows:

$$Q_2 = \int_0^{t_2} i \, dt = 2 \, t_2/\pi \cdot \int_0^{\pi/2} h \cos\theta \, d\theta \qquad (4)$$
$$= 2/\pi \cdot h \cdot t_2.$$

Suppose that the electric charge $Q_0$ is wholly charged into the capacitor $C_0$. At this time, a maximum voltage $V_O$ of the capacitor $C_0$ is given as follows:

$$V_0 = Q_0/C_0 = 2/\pi \cdot h t_2/C_0 \qquad (5).$$

Figure 18:
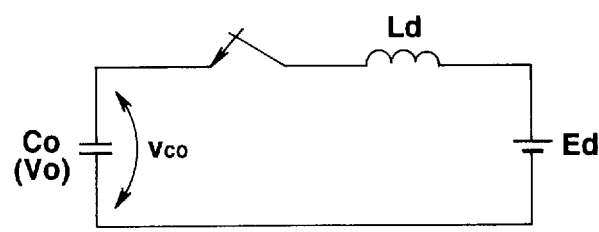
FIG. 18 is an equivalent circuit of an output part.

3) Mode C:

Upon the completion of the charge of the capacitor $C_0$, the capacitor $C_0$ is discharged with the initial voltage $V_0$ via the diode $D_2$ and the reactor $L_d$. The voltage $VC_0$ of the capacitor $C_0$ is given in the following equation (6) from the transient phenomenon analysis of an equivalent circuit shown in FIG. 18.

$$V_{C0} = V_0 - (V_0 - E_d)(1 - \cos\omega t) \qquad (6),$$

wherein $\omega = 1/(Ld \cdot C_0)$.

To achieve $$V_{C0} \leq 0, \; V_{C0} \geq 2 \, Ed \qquad (7).$$

Then, if $V_o \approx 2.5 \, Ed$, the discharge time $t_3$ of the capacitor $C_0$ may satisfy the following equation (8) according to the resonance period of $(Ld - C_0)$.

$$t_3 < 2\pi/2 \cdot Ld \cdot C_0 = \pi Ld C_0 \qquad (8).$$

Hence, if $t_3$ and $C_0$ are given, the reactor $Ld$ is determined according to the following equation (9).

$$Ld = [t_3/\pi]^2/C_0 \qquad (9).$$

4) Relationship between the output current Id and the $S_1$ peak current h of the element $S_1$.

This relationship will be expressed as follows (10).

$$Id = (Q_1 + Q_2)/T \qquad (10)$$
$$= [1/2 t_1 h + 1/2 t_2 h]/T.$$

Figure 19:
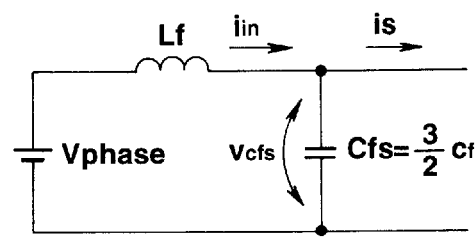
FIG. 19 is an equivalent circuit of an input filter.

(2) Filter portion:

FIG. 19 shows an equivalent circuit of one phase of the input filter F. If the reactor Lf is relatively large and the current $i_s$ (=the average value during the interval of T is Id) flows instantaneously in a pulse form, the current $i_s$ causes the drop of the voltage $V_{ofs}$. Hence, the relationship to the dropped voltage $V_{PP}$ is given in the following equation (11).

$$V_{PP} = Id \cdot T/C_{fs} \qquad (11).$$

On the other hand, since the dropped voltage $V_{PP}$ is directly applied to the reactor Lf, the variation during the interval of T/2 (ripple P—P) of the input current $i_{in}$ is given with $\alpha_1 + \alpha_2 \approx 0.5$ taken into consideration as follows:

$$I_{PP} = V_{PP}/Lf \cdot T/2 \qquad (12).$$

As described above, the circuit constants in the case where the input voltage, output voltage, output current, the switching frequency, and the on duration of each element are already known are determined as follows:

a) Deriving the peak value of the current flowing through the element $S_1$ from the equation (10);

b) Deriving the inductance value of Lo from the equation (2);

c) Deriving the maximum voltage of $C_0$ from the equation (7);

d) Deriving the electrostatic capacitance of $C_0$ from the equation (5);

e) Deriving the inductance value of $L_1$ from the equation (9); and f) Deriving the electrostatic capacitance value and inductance value of the filter F from the equations (11) and (12).

It is noted that the electrostatic capacitance of the electrolytic capacitor $C_2$ of the DC output is determined according to an allowable smoothing ripple and a life of the electrolytic converter and is selected irrespective of the basic operating principle.

Figure 21:
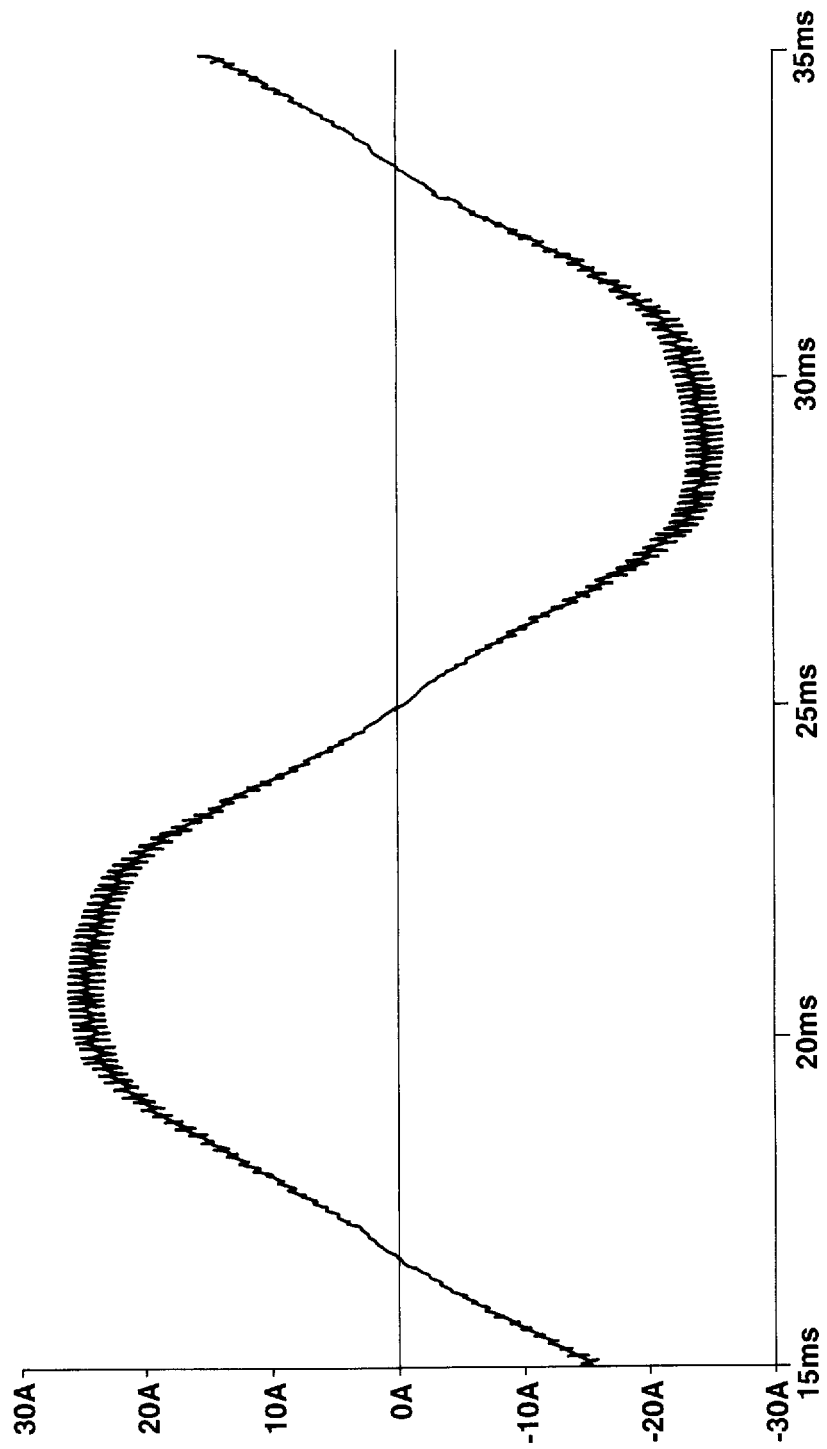
FIG. 21 is a waveform chart of an input current of the converter.

FIG. 21 shows an input current waveform. The operating conditions are input voltage of 200 Vrms, output voltage of 300 Vdc, output current of 20 A, and the switching frequency of 10 KHz.

Figure 22:
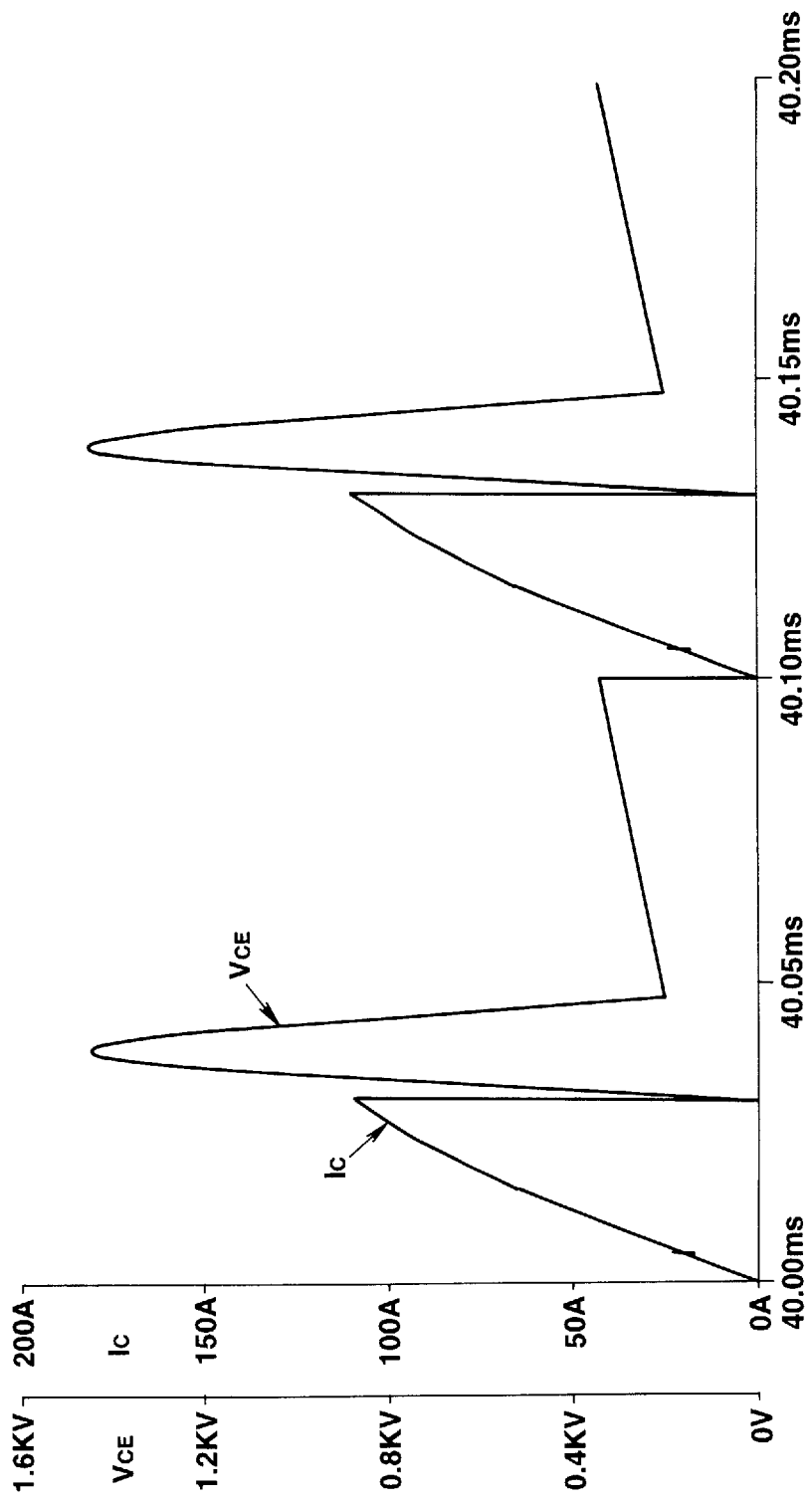
FIG. 22 is a waveform chart of an input current and voltage of the element S1.
Figure 23:
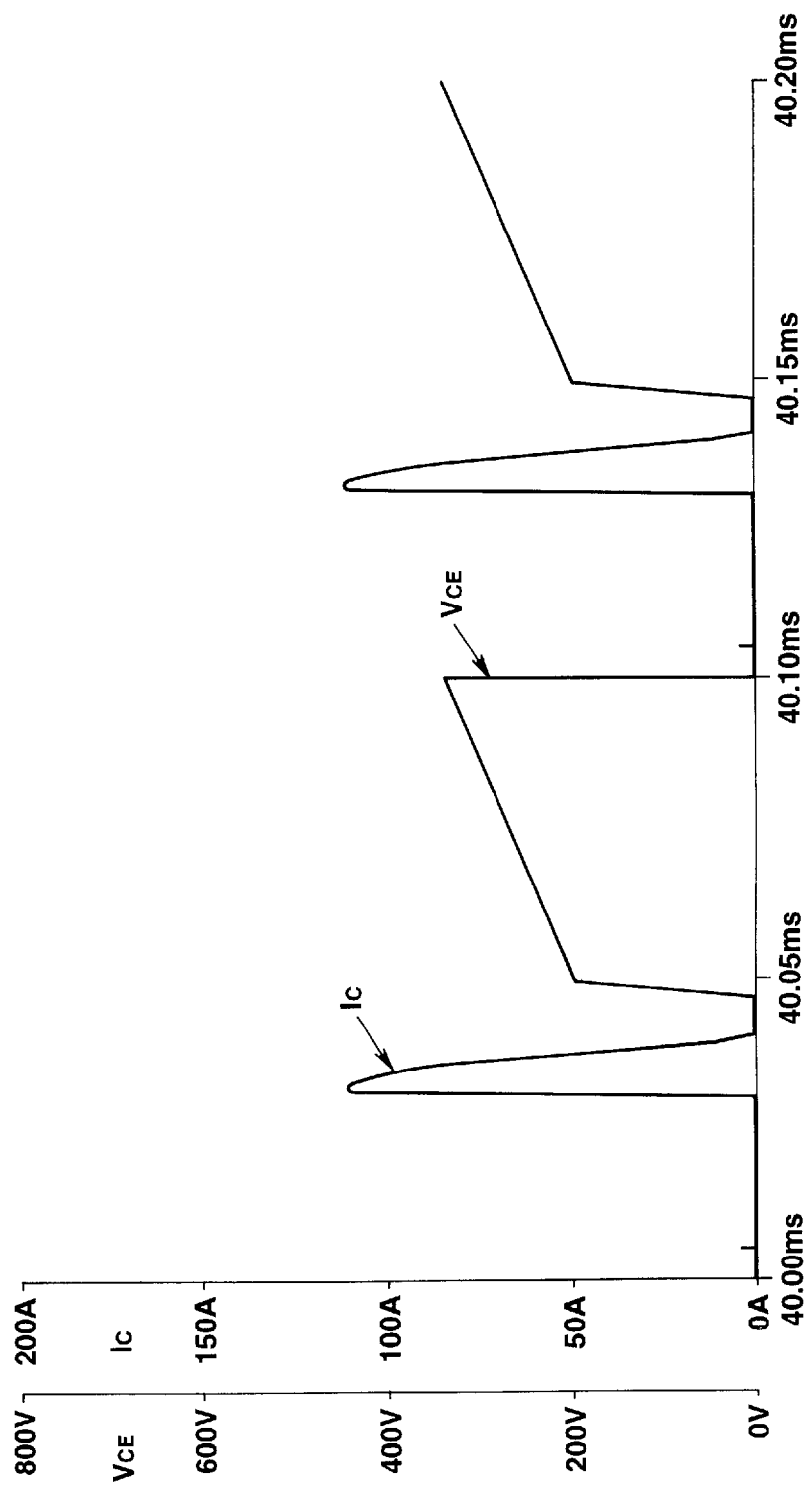
FIG. 23 is a waveform chart of a voltage and current of the element S2.

FIGS. 22 and 23 show the collector-emitter voltage $V_{CE}$ and collector current $I_C$ when the elements $S_1$ and $S_2$ are turned on and off. The element $S_1$ achieves ZCS during the turn on of the element $S_1$, the element $S_2$ achieves ZVS during the turn off of the element $S_2$ and achieves ZVS and ZCS during the turn off of the element $S_2$. Hence, almost no switching loss occurs. Hence, the highly efficient sinusoidal wave inputted converter can be achieved.

Ninth Embodiment

Figure 24:
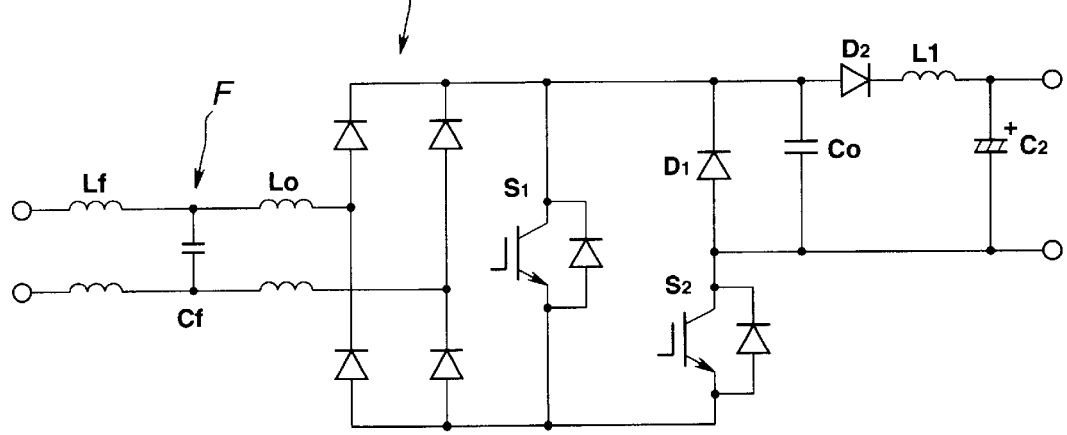
FIG. 24 is a circuit wiring diagram of a converter related to a ninth preferred embodiment according to the present invention.

FIG. 24 shows a ninth embodiment of the single-phase sinusoidal wave inputted converter of the resonance type.

The converter is different from the three-phase converter of FIG. 16 in that the input filter F and the rectifier 1 of the diode bridge are used for the single phase types. The other structure is the same. The basic operation is the same as the circuit shown in the three-phase circuit shown in FIG. 16. The explanation of the single-phase converter will be omitted. The sinusoidal wave inputted converter can be achieved with no requirement of the current detector with the same control circuit structure.

Tenth Embodiment

Figure 25:
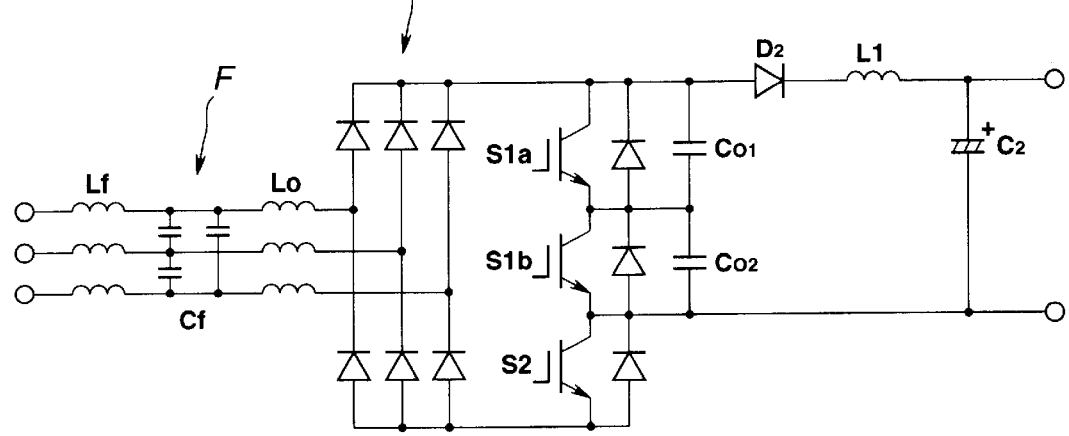
FIG. 25 is a circuit wiring diagram of a converter related to a tenth preferred embodiment according to the present invention.

In the converter of FIG. 16, the peak voltage across the element $S_1$ reaches about 1440 volts as shown in FIG. 22. Hence, in this case, the switching element is required having a large rated voltage. FIG. 25 shows a tenth embodiment of the single-phase sinusoidal wave inputted converter of the resonance type in order to reduce the burden of the peak voltage applied to the switching element.

In FIG. 25, F denotes the input filter constituted by the reactors Lf and Lo and by the capacitor group Cf, 1 denotes the rectifier of the diode bridge connected to the power supply via the input filter F, $S_{1a}$, $S_{1b}$, and $S_2$ denote switching elements of the IGBT serially connected between the output terminals of the rectifier of the diode bridge 1. $C_{01}$ and $C_{02}$ denote the capacitors connected in parallel to the elements $S_{1a}$ and $S_{1b}$, $D_2$ denote the diode arranged for rectifying the terminal voltages of the capacitors $C_{01}$ and $C_{02}$, and $L_1$ and $C_2$ denote the reactor and the electrolytic capacitor arranged for smoothing the output voltage of the diode $D_2$.

Figure 26:
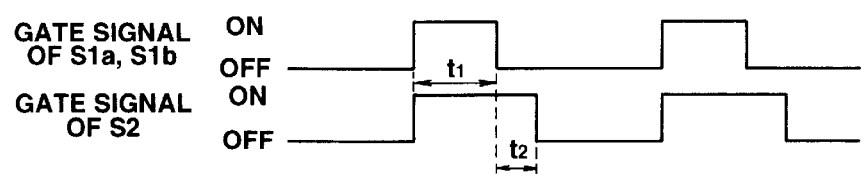
FIG. 26 is integrally a waveform chart of gate signals of the elements S1$a$, S1$b$, and S2.

The elements $S_{1a}$ and $S_{1b}$ are controlled in response to the gate signals of the ON time $t_1$ as shown in FIG. 26 and are controlled in response to the gate signals of time $(t_1+t_2)$. The operating conditions are the same as those in the case of the eighth embodiment and the explanation thereof will be omitted.

Figure 27:
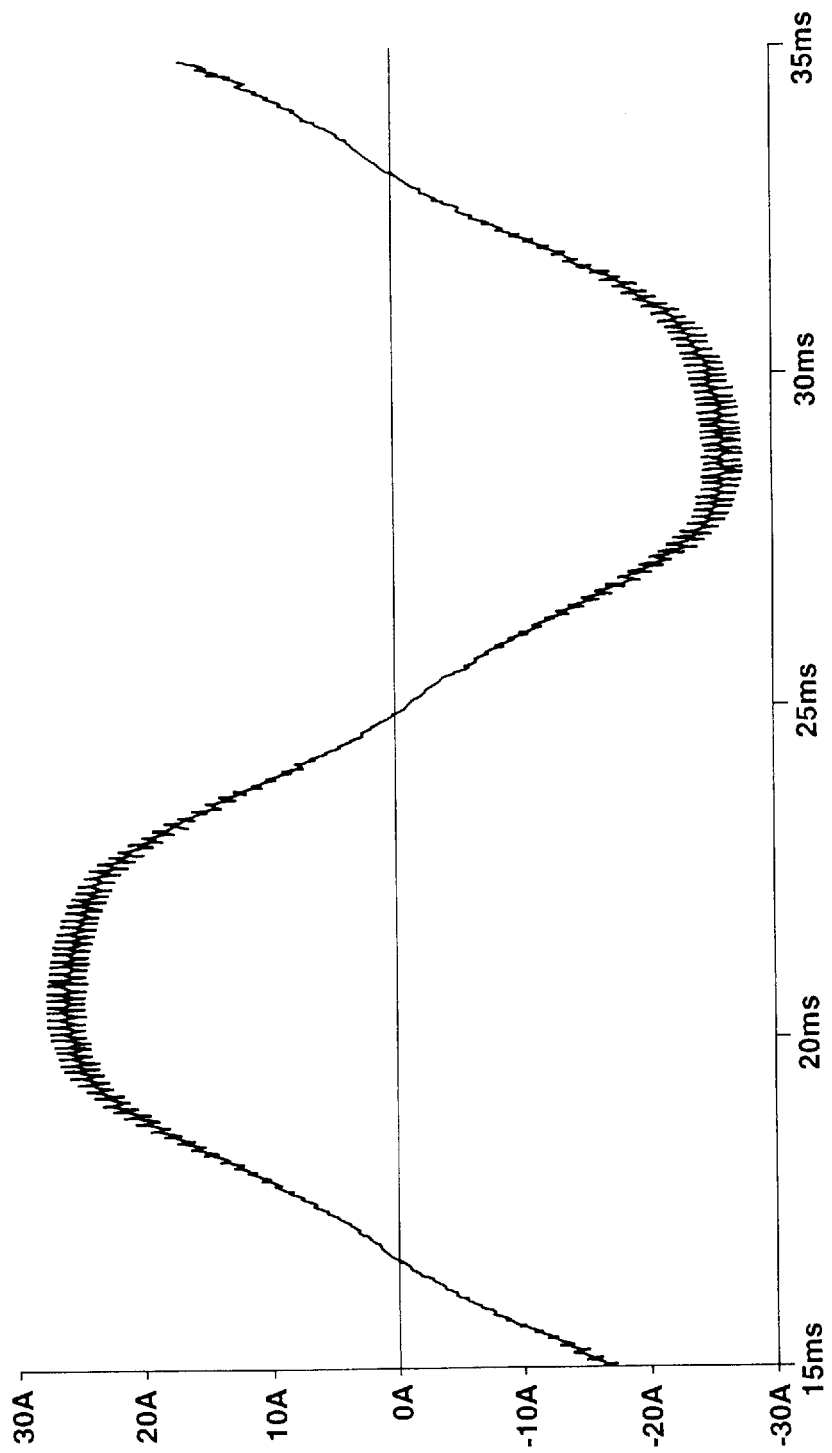
FIG. 27 is a waveform chart representing an input current of the converter.
Figure 28:
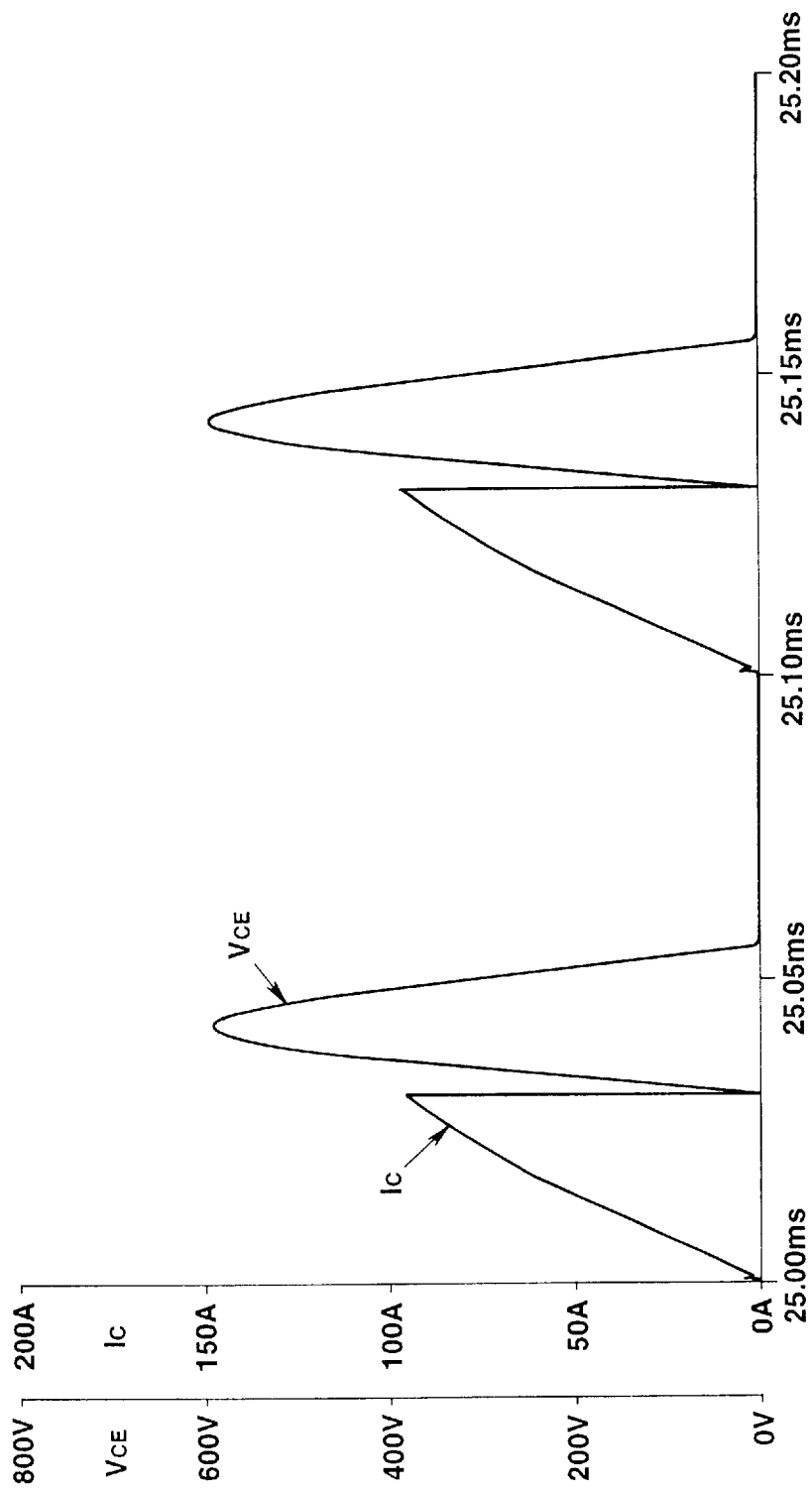
FIG. 28 is integrally a waveform chart representing voltage and current waveforms of a circuit element S1$a$.
Figure 29:
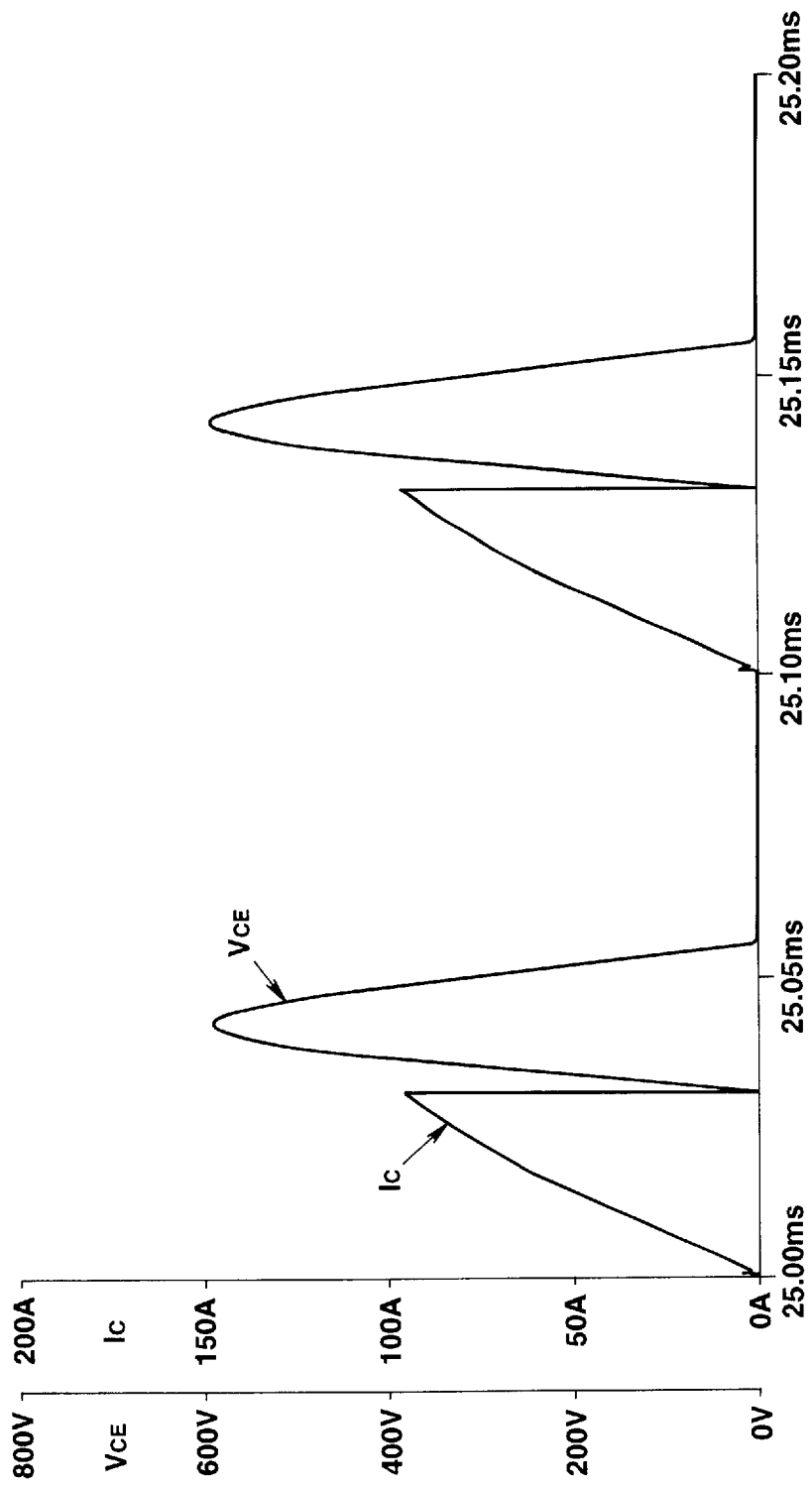
FIG. 29 is integrally a waveform chart representing voltage and current waveforms of a circuit element S1$b$.
Figure 30:
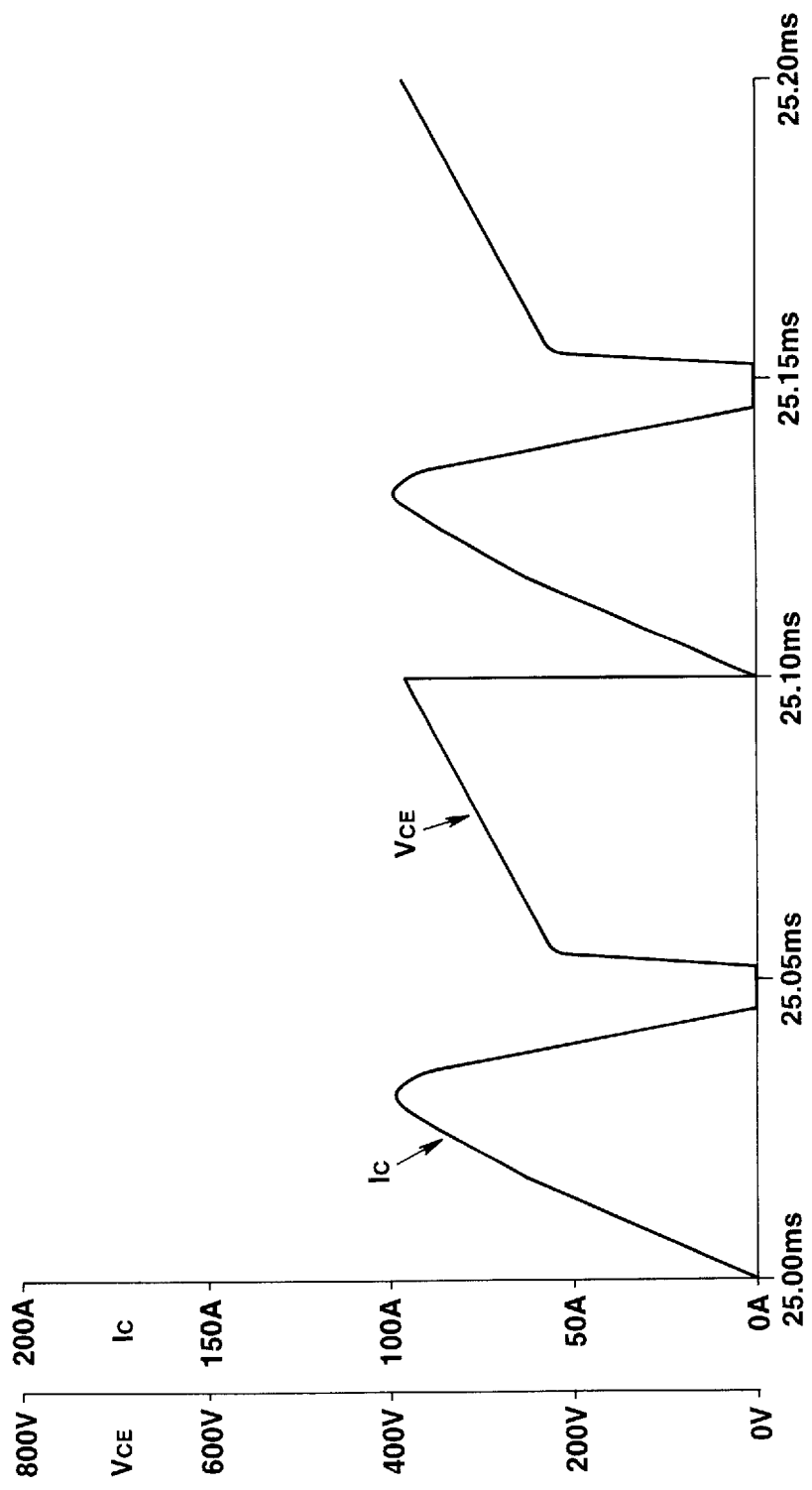
FIG. 30 is integrally a waveform chart representing voltage and current waveforms of a circuit element S2.

The input current waveform of the converter is shown in FIG. 27, the voltage and current waveforms of the elements $S_{1a}$, $S_{1b}$ and $S_2$ are shown in FIGS. 28, 29, and 30.

In the tenth embodiment, the peak voltage of the elements $S_{1a}$ and $S_{2b}$ is below 600 volts and the switching elements of the rate voltages of 600 volts used in normally 200 volt system equipment can be applied.

Eleventh Embodiment

Figure 31:
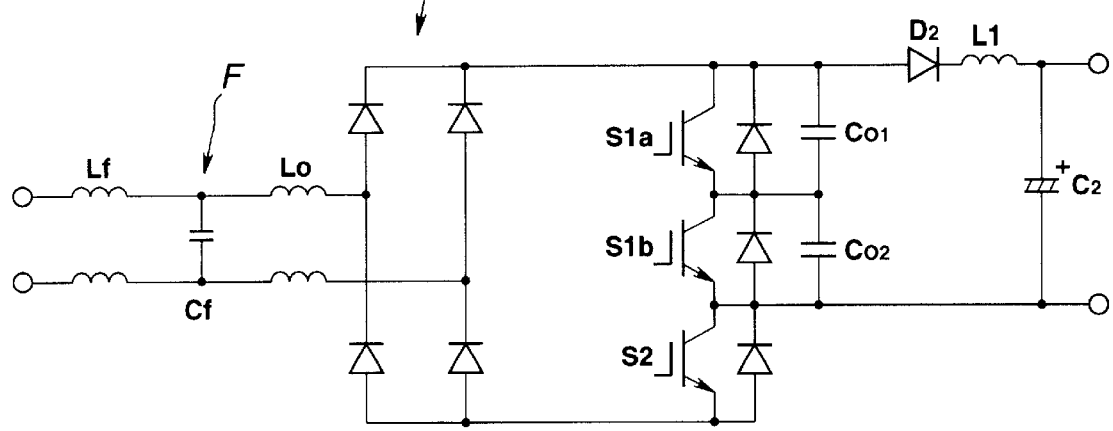
FIG. 31 is a circuit wiring diagram of a converter related to an eleventh preferred embodiment according to the present invention.

FIG. 31 shows the single-phase sinusoidal wave inputted converter of the resonance type. This circuit shown in FIG. 31 is different from the three-phase converter shown in FIG. 25 in that the input filter F and the rectifier 1 of the diode bridge are used for the single-phase converter. The other structure is the same as that of the three-phase converter. Hence, the basic operation is the same as that shown in FIGS. 16 and 25 and the explanation thereof will be omitted herein.

Twelfth Embodiment

Figure 32:
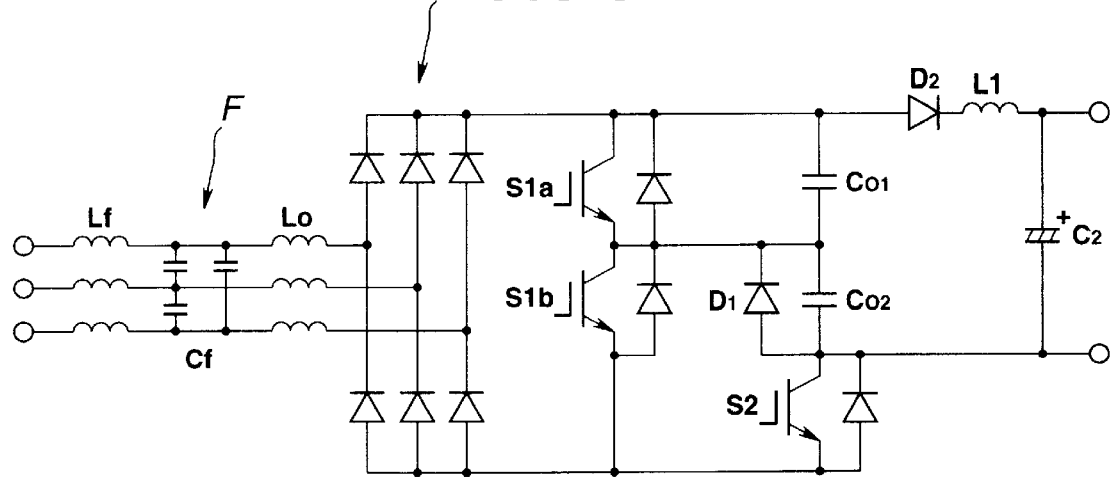
FIG. 32 is a circuit wiring diagram of a converter related to a twelfth preferred embodiment according to the present invention.

FIG. 32 shows a twelfth embodiment of the converter of the three-phase type which can reduce a burden of the peak voltage on the switching element in the same way as the circuit shown in FIG. 25.

In FIG. 32, F denotes an input filter having the reactors Lf and Lo and the capacitor group Cf, 1 denotes the rectifier of the three-phase diode bridge, $S_{1a}$ and $S_{1b}$ denote IGBT switching elements serially connected with each other between output terminals of the diode bridge 1, $C_{01}$, $C_{02}$, and $S_2$ denote capacitors and IGBT switching element serially connected to each other between the output terminals of the rectifier of the diode bridge 1, a junction between the capacitors $C_{01}$ and $C_{02}$ is connected to a junction between the switching elements of $S_{1a}$ and $S_{1b}$, a diode $D_1$ is connected across the capacitor of $C_{02}$. In FIG. 32, the diode $D_2$ is provided for rectifying the terminal voltage across the serially connected capacitors $C_{01}$ and $C_{02}$, $L_1$ and $C_2$ denote the reactor and the electrolytic capacitor arranged for smoothing the output voltage of the diode $D_2$.

Figure 33:
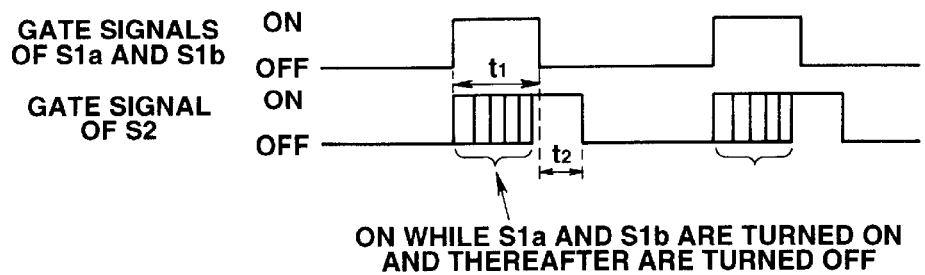
FIG. 33 is integrally a timing chart of gate signals of circuit elements of S1$a$, S1$b$, and S2.

As shown in FIG. 33, the switching elements $S_{1a}$ and $S_{1b}$ are controlled according to the gate signal having the ON duration of $t_1$ and the switching element $S_2$ is controlled so as to turn on during the time at which both of the switching elements $S_{1a}$ and $S_{1b}$ are turned to ON and to turn to OFF and so as to turn off after the time $t_2$ upon the turn off of the switching elements $S_{1a}$ and $S_{1b}$. Since the operating condition is the same as the eighth embodiment, its explanation will be omitted herein.

Figure 34:
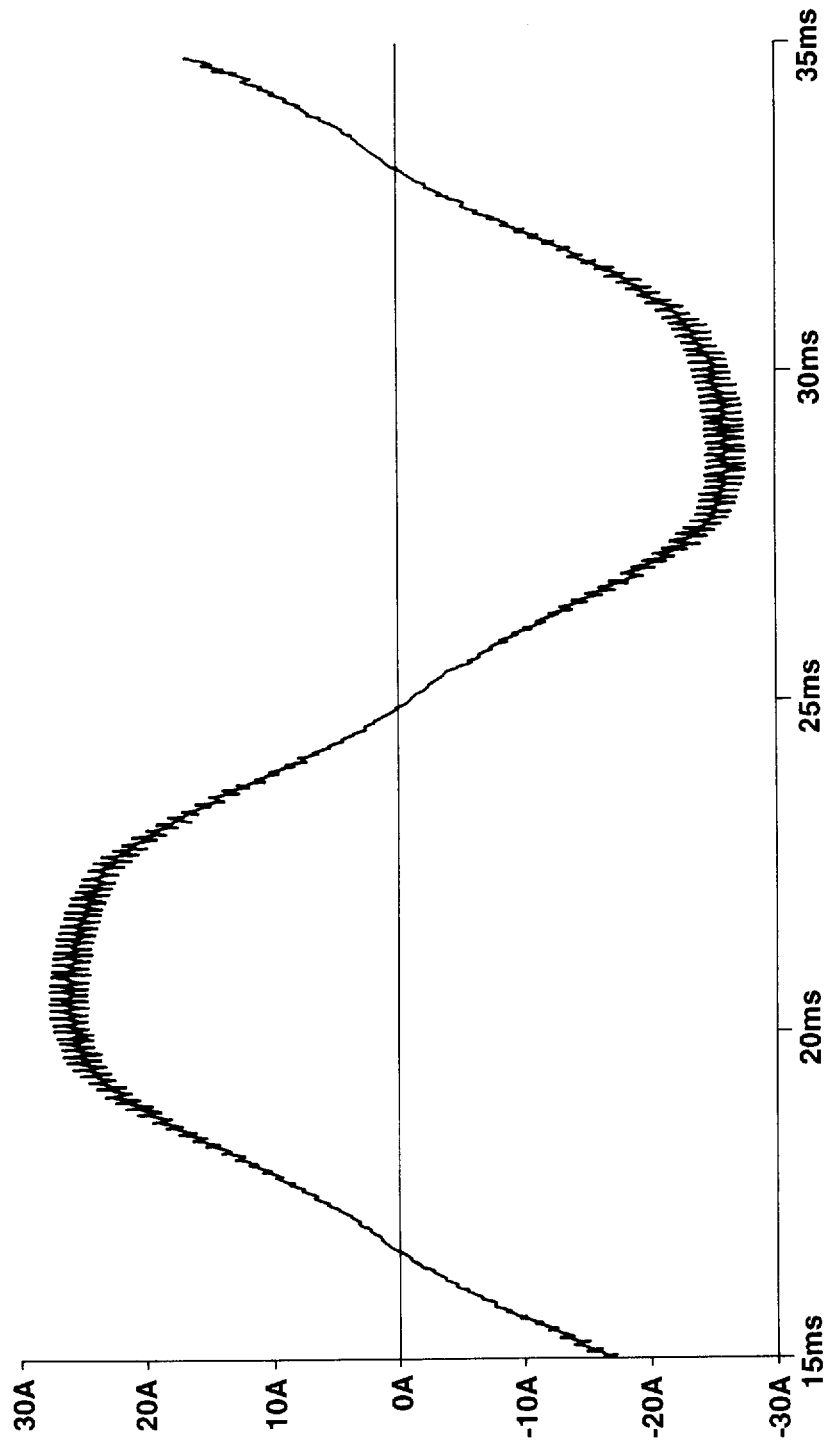
FIG. 34 is integrally a waveform chart of an input current of the converter shown in FIG. 32.
Figure 35:
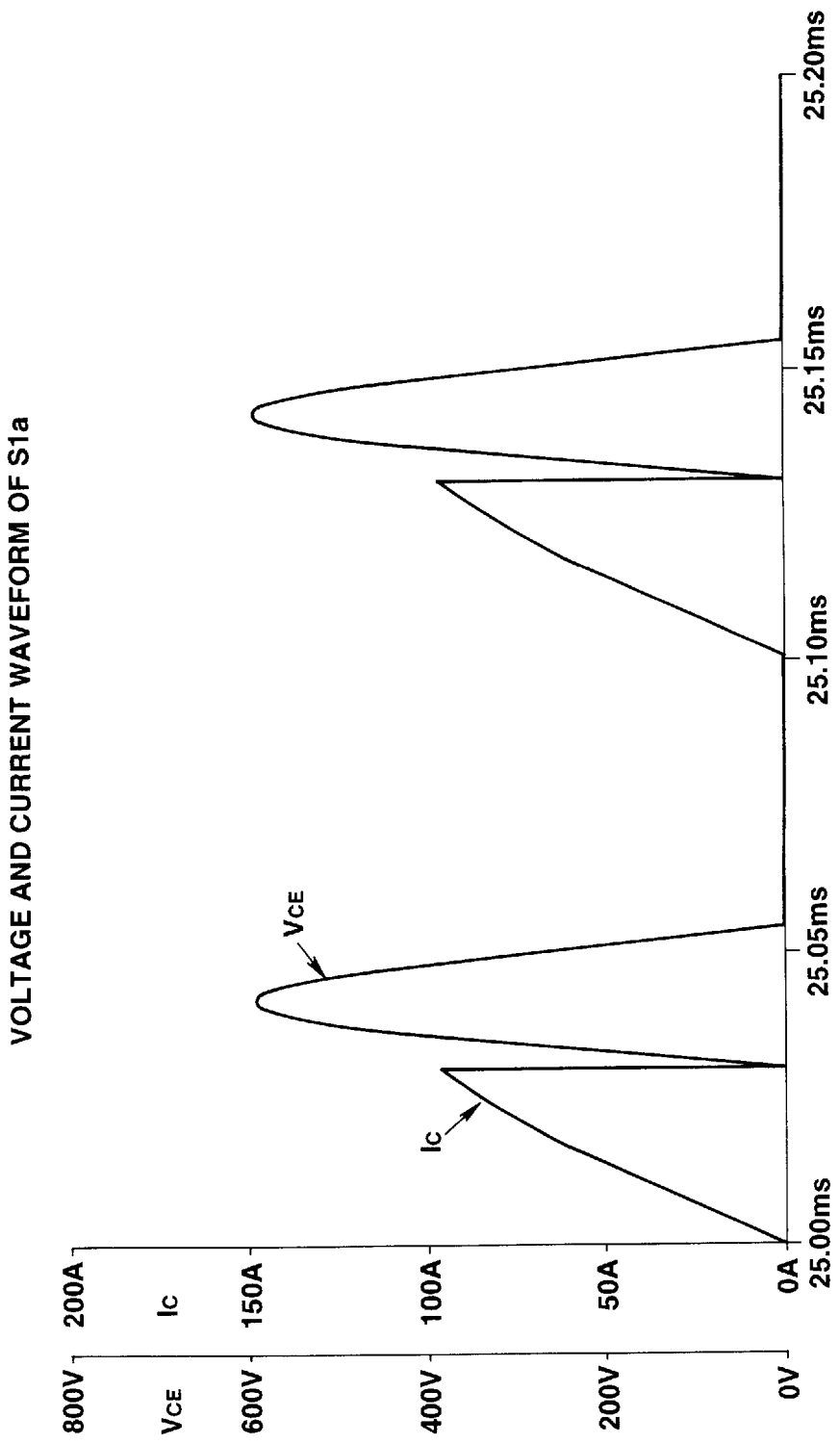
FIG. 35 is integrally a waveform chart of a circuit element S1$a$.
Figure 36:
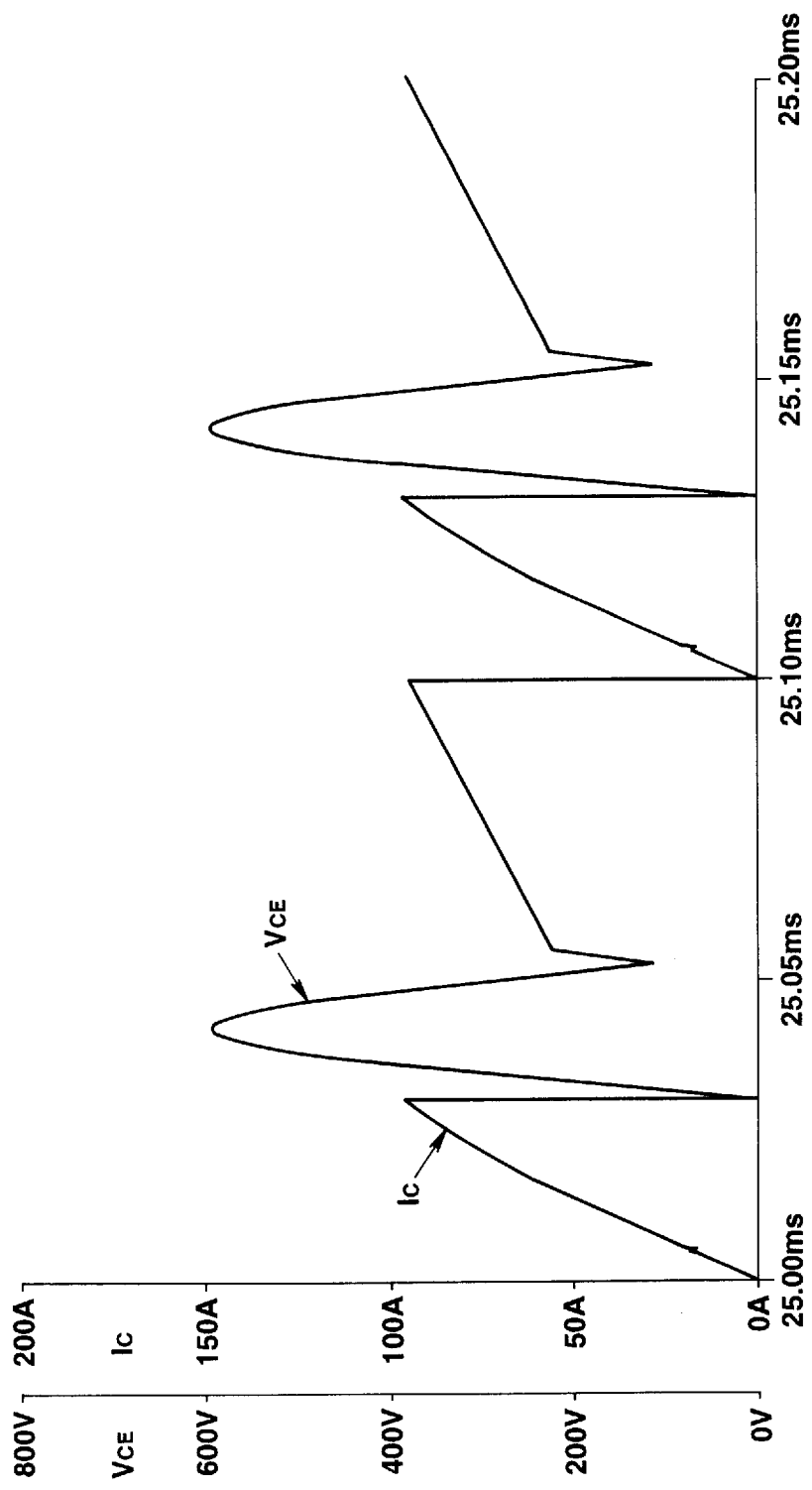
FIG. 36 is integrally a waveform chart of a circuit element S1$b$.
Figure 37:
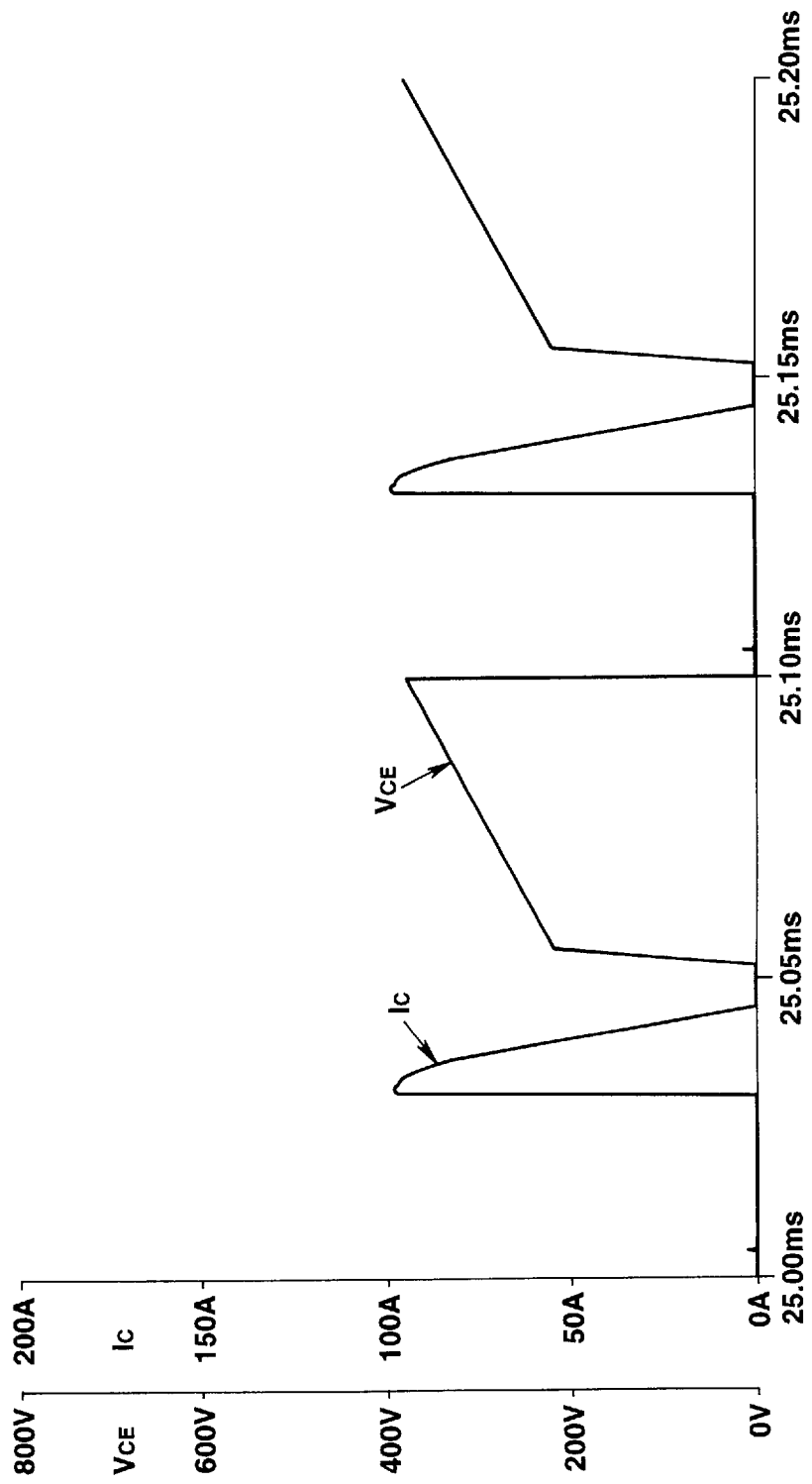
FIG. 37 is integrally a waveform chart of current and voltage of the circuit element S2.

The input current waveform of the circuit is shown in FIG. 34 and the voltage and current waveforms of the switching elements $S_{1a}$, $S_{1b}$, and $S_2$ are shown in FIGS. 35, 36, and 37.

In the twelfth embodiment, the peak voltages of the switching elements $S_{1a}$ and $S_{1b}$ are below 600 volts so that the switching element of the rated voltage of 600 volts is commonly used in 200 V system equipment can be applied.

It is noted that a conductive loss of the switching element $S_2$ is reduced as compared with the tenth embodiment (in the tenth embodiment, it is necessary to turn on the switching element $S_2$ during the turn on of the switching elements $S_{1a}$ and $S_{1b}$). Both of the power supply short-circuit current and charge current of the resonance capacitors $C_{01}$ and $C_{02}$ flow through the switching element $S_2$. However, in the twelfth embodiment, only the resonance capacitor charging current flows through the switching element $S_2$) and the extra diode of $D_1$ is needed.

Thirteenth Embodiment

Figure 38:
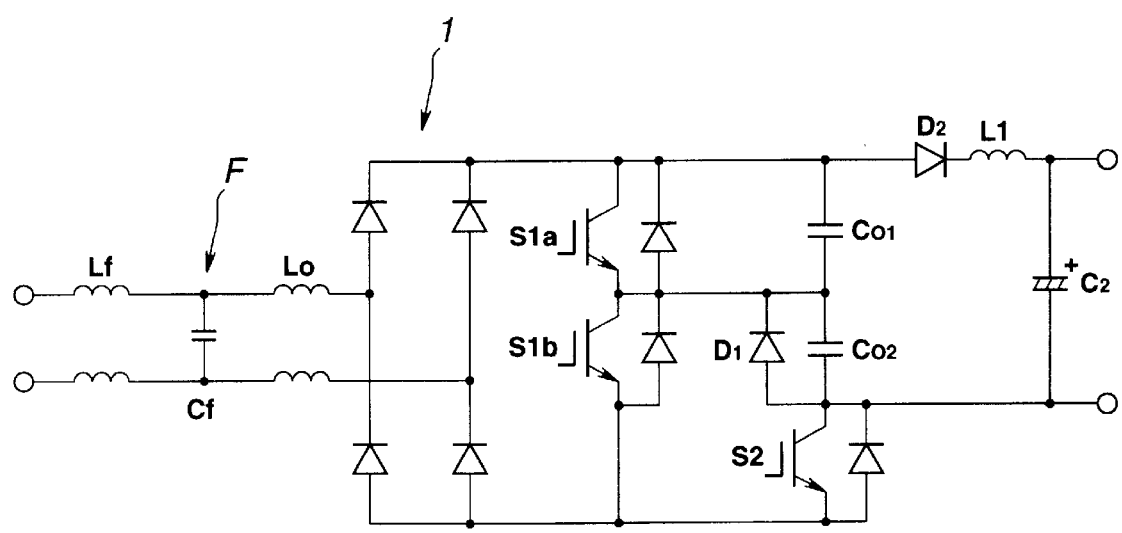
FIG. 38 is a circuit wiring diagram of a converter related to a thirteenth preferred embodiment according to the present invention.

FIG. 38 shows the three-phase sinusoidal wave inputted converter of the resonance type in a thirteenth embodiment.

The circuit shown in FIG. 38 is different from the three-phase converter shown in FIG. 32 in that the input filter F and the rectifier 1 of the diode bridge are used for the single phase purpose. The other structure is the same as that in the converter shown in FIG. 32. Hence, the basic operations in the thirteenth embodiment are the same as those in FIGS. 25 and 32 and the explanations thereof will be omitted herein.

Fourteenth Embodiment

Figure 39:
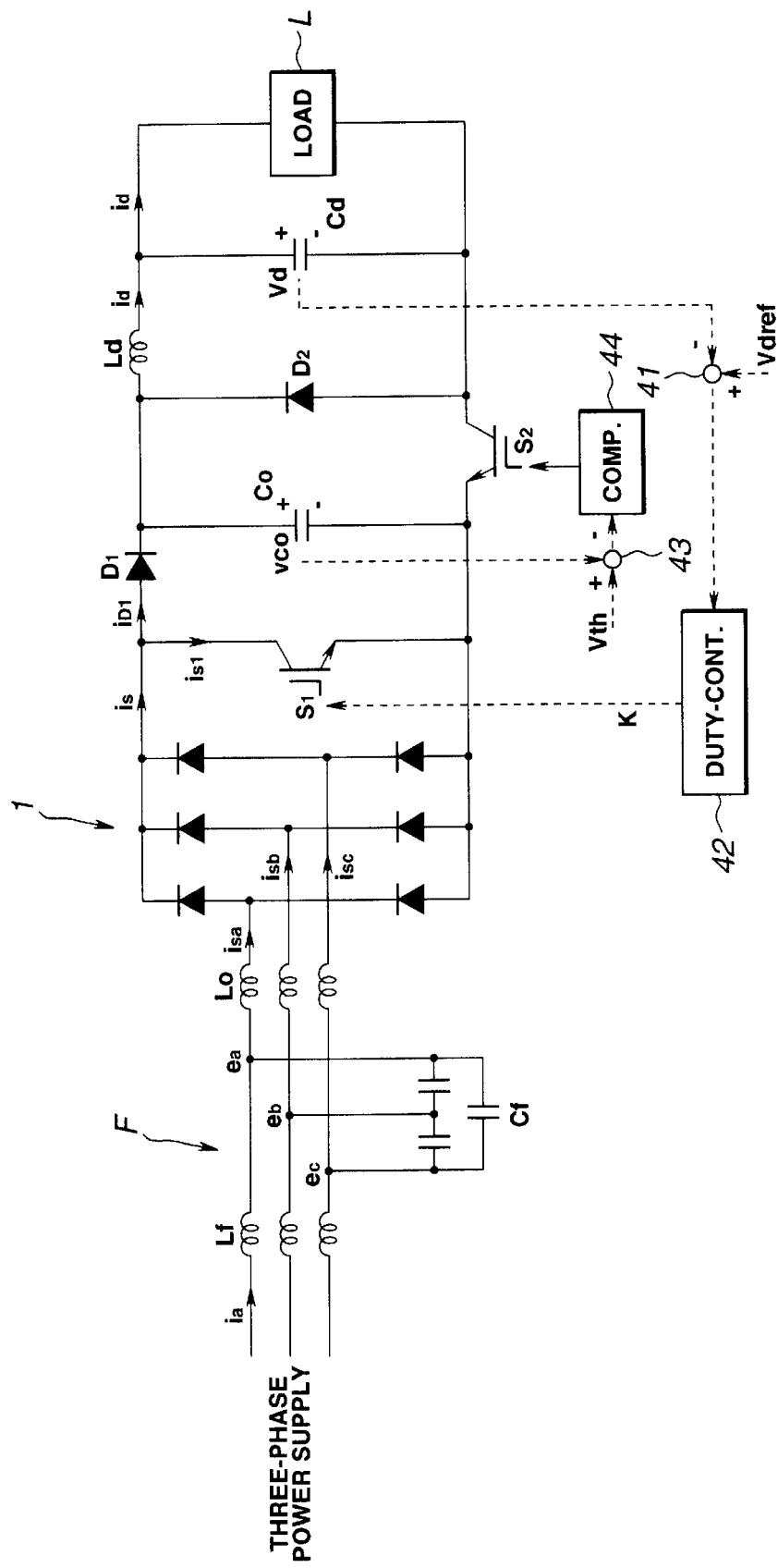
FIG. 39 is a circuit wiring diagram of a converter related to a fourteenth preferred embodiment according to the present invention.

FIG. 39 shows the converter of the three-phase sinusoidal wave inputted converter of the resonance type in a fourteenth embodiment.

In the fourteenth embodiment, the converter has the feature such that the number of switching elements is reduced and no current detector is needed.

In FIG. 39, F denotes the three-phase input filter having the reactors Lf and Lo and the capacitor group Cf, 1 denotes the rectifier of the diode bridge connected to the power supply via the input filter F, $S_1$ denotes the IGBT element connected between the output terminals of the rectifier 1 of the diode bridge, $D_1$ and $C_0$ denote the diode and capacitor connected between the terminals of the rectifier of the diode bridge, Ld denotes the dc reactor connected to the plus terminal +of the capacitor $C_0$, $C_d$ denotes the electrolytic capacitor arranged for smoothing the output voltage of the reactor Ld, L denotes the load connected in parallel to the capacitor Cd, $S_2$ denotes the IGBT switching element serially connected between one end of the capacitor Cd and one end terminal of the rectifier 1 of the diode bridge, $D_2$ denotes the diode connected between one end of the capacitor Cd and the input side of the reactor Ld, 41 denotes a subtractor arranged for detecting a difference between an instruction value Vdref of the capacitor voltage Cd and the detected value Vd of the capacitor voltage Cd, 42 denotes a duty ratio controller arranged for receiving the difference voltage and for controlling a duty ratio of the gate signal to the gate of the IGBT element $S_2$, 43 denotes a subtractor arranged for detecting a difference between a target value of the capacitor voltage $C_0$ and the detected voltage $V_{C0}$, and 44 denotes a window-type comparator arranged for receiving the difference voltage and controlling the gate of the IGBT element $S_2$.

The operation of the converter shown in FIG. 39 will be described with reference to FIG. 40.

The switching element $S_1$ is controlled by means of the duty ratio controller 42 so as to repeat the turn on or off of the IGBT element $S_1$. While the switching element $S_1$ is turned to ON, the output terminals of the rectifier 1 of the diode bridge are short-circuited so that the energy is stored into the reactors Lf and Lo of the input filter F according to the currents $i_{sa}$ through $i_{sc}$. When the element $S_1$ is turned to OFF, the energy of the reactors Lf and Lo flows into the diode $D_1$ via the diode bridge 1 (current $iD_1$).

The capacitor Co is charged according to the current $iD_1$. When the capacitor voltage Vco reaches a target voltage Vth, the window-type comparator 44 outputs a turn on signal to turn on the IGBT element $S_2$. Thus, the current id from the reactor Ld to the capacitor Cd flows so that the capacitor Cd is charged and is discharged to the load.

When the capacitor voltage Vco is reduced, the output voltage of the window-type comparator 44 is nulled. When the IGBT element $S_2$ is turned off, the energy stored in the reactor Ld according to the current id flows through the circuit of the diode $D_2$ into the capacitor Cd and load L ($D_2$ is turned on).

Figure 40:
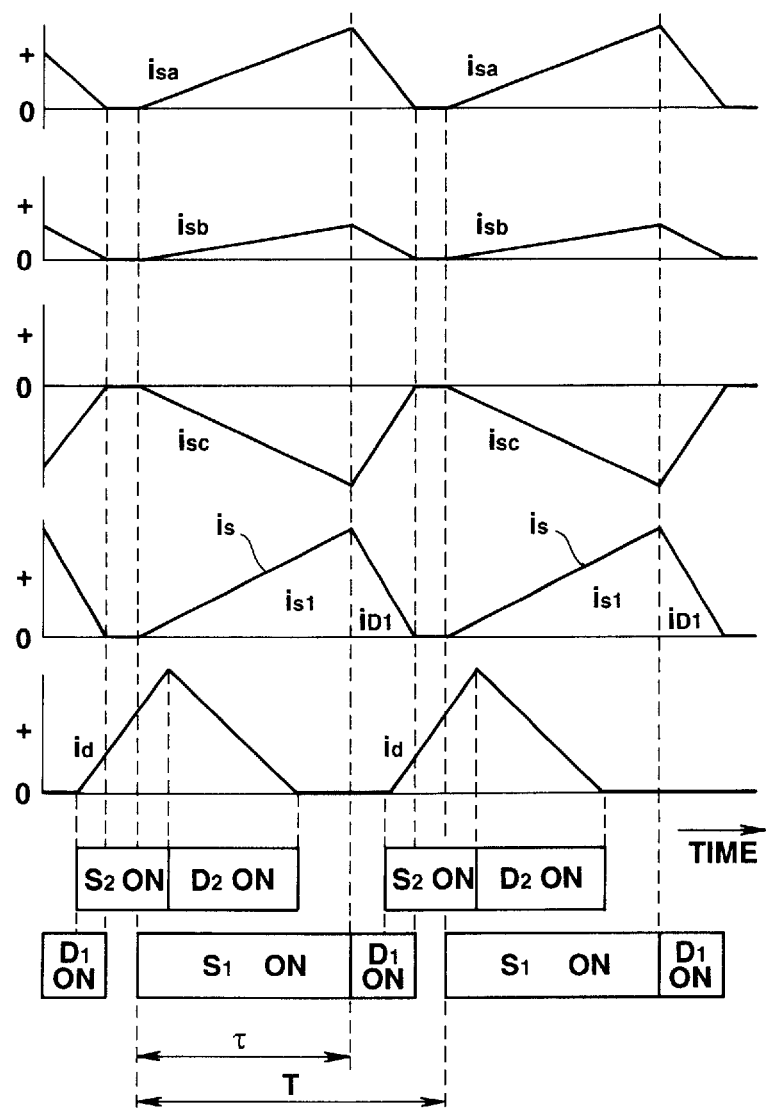
FIG. 40 is integrally an explanatory view of operation modes in the fourteenth preferred embodiment.
Figure 41:
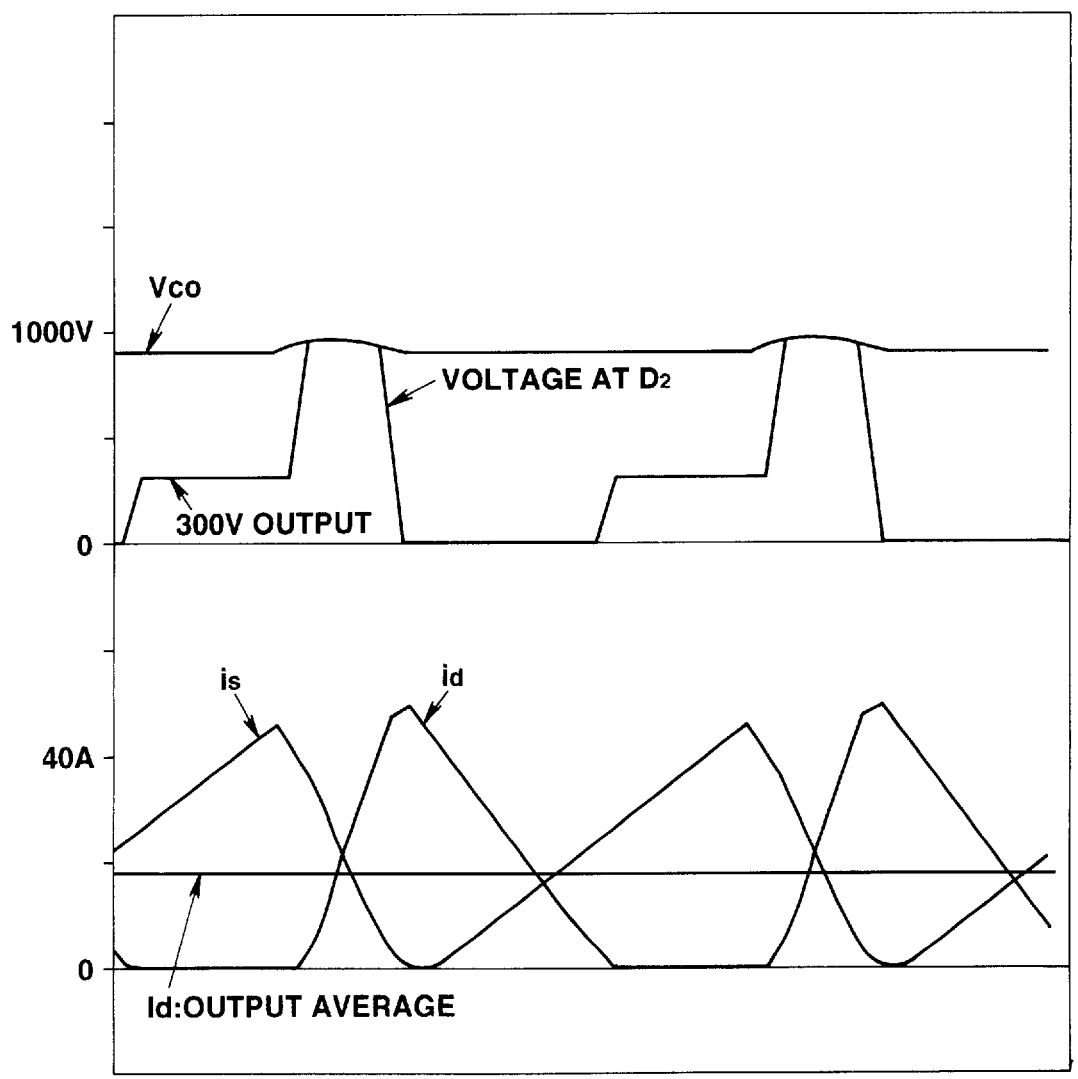
FIG. 41 is integrally a waveform chart representing voltage and current at respective parts of the converter.

The IGBT element $S_1$ is controlled to be turned on during the interval τ in the synchronization interval of T in which the element $S_1$ is turned on as shown in FIG. 40 by means of the duty ratio controller 42, the interval τ being controlled so that when the capacitor voltage Vd is varied, the voltage Vd becomes equal to the instruction value (reference value) Vdref and the capacitor voltage Vd being controlled at constant. The voltage and current waveforms of the respective parts of the converter are shown in FIG. 41.

Figure 42:
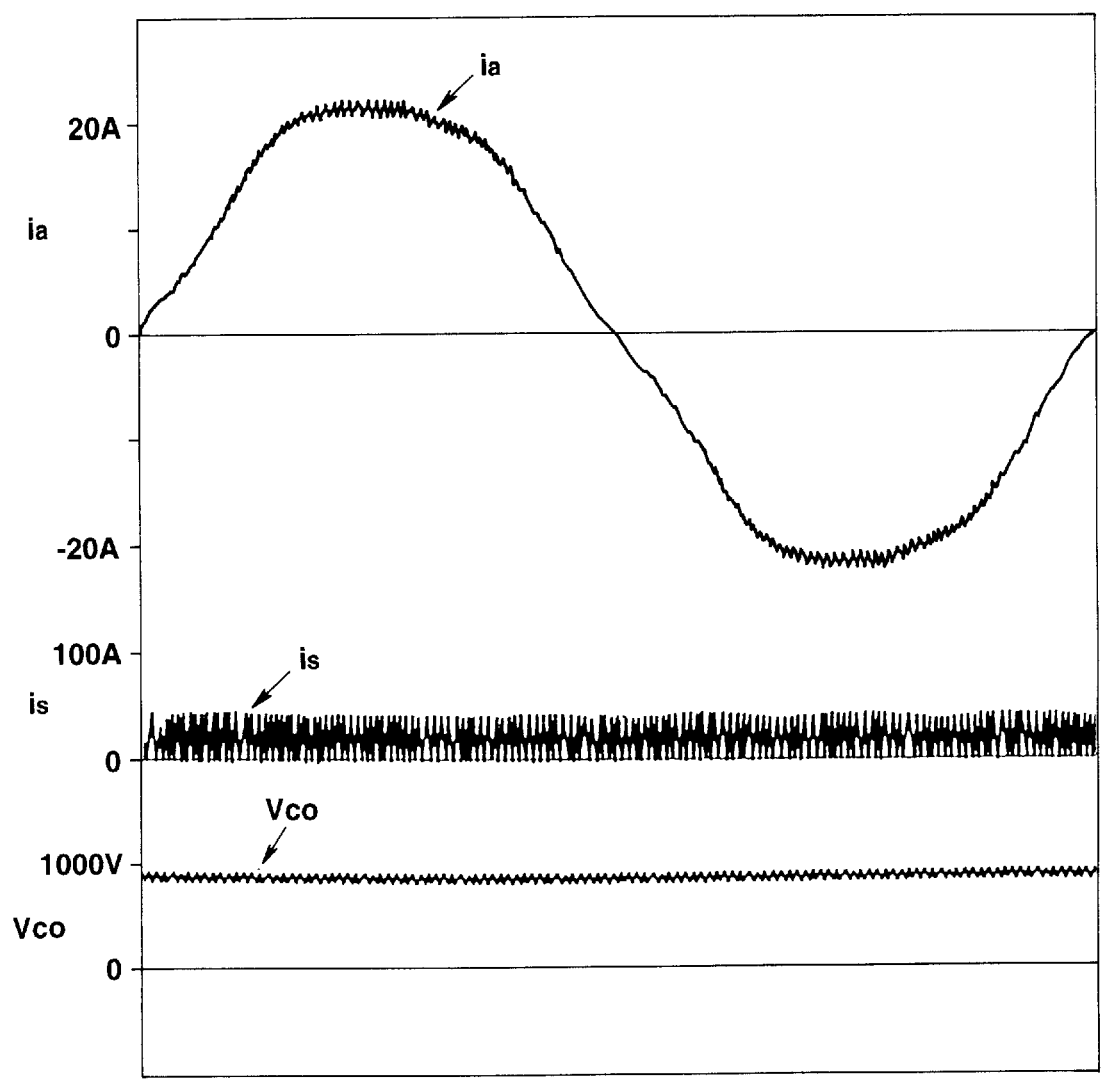
FIG. 42 is integrally a waveform chart representing a current and a voltage at each part of the converter.

The input waveform of the converter shown in FIG. 39 provides the sinusoidal waveform as shown in FIG. 42. No current detector as shown in FIG. 14 and much use of the IGBT elements as shown in FIG. 32 are needed in this embodiment.

Fifteenth Embodiment

Figure 43:
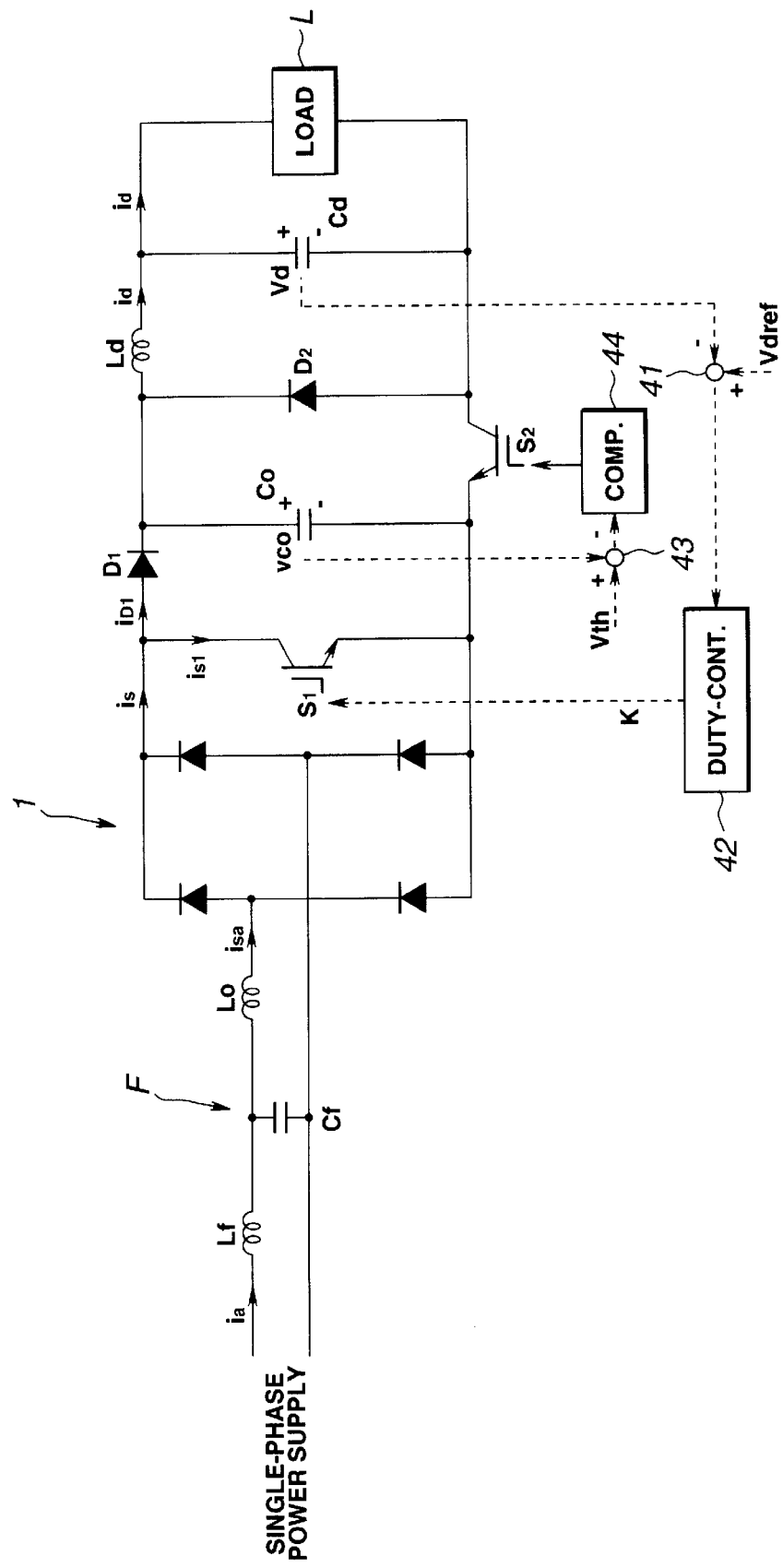
FIG. 43 is a circuit wiring diagram of a converter related to a fifteenth preferred embodiment according to the present invention.
Figure 44:
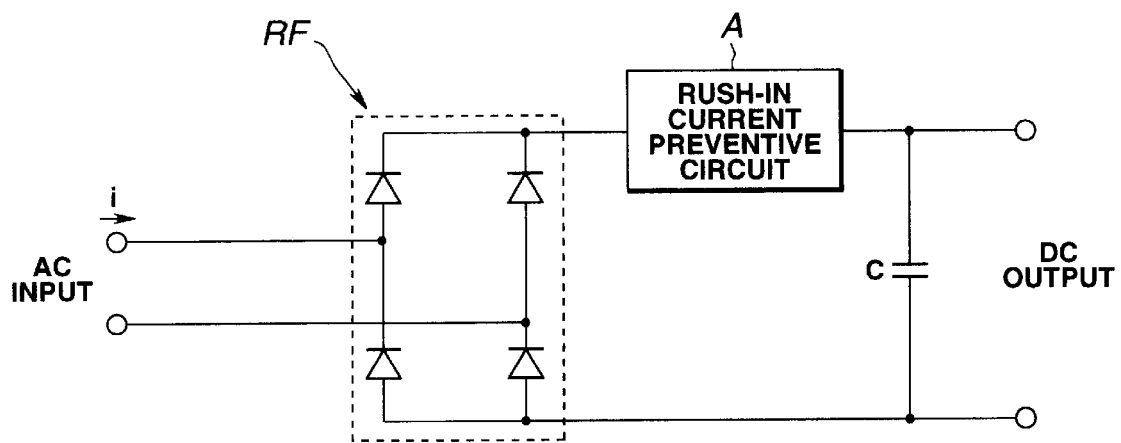
FIG. 44 is a circuit wiring diagram of a conventional rectifier and smoother as a conventional example 1.
Figure 45:
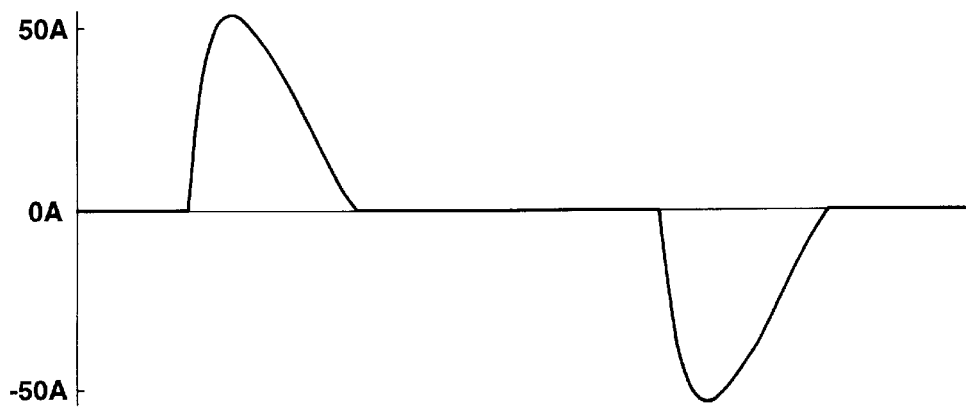
FIG. 45 is a waveform chart of an input current of a converter shown in FIG. 44.
Figure 46:
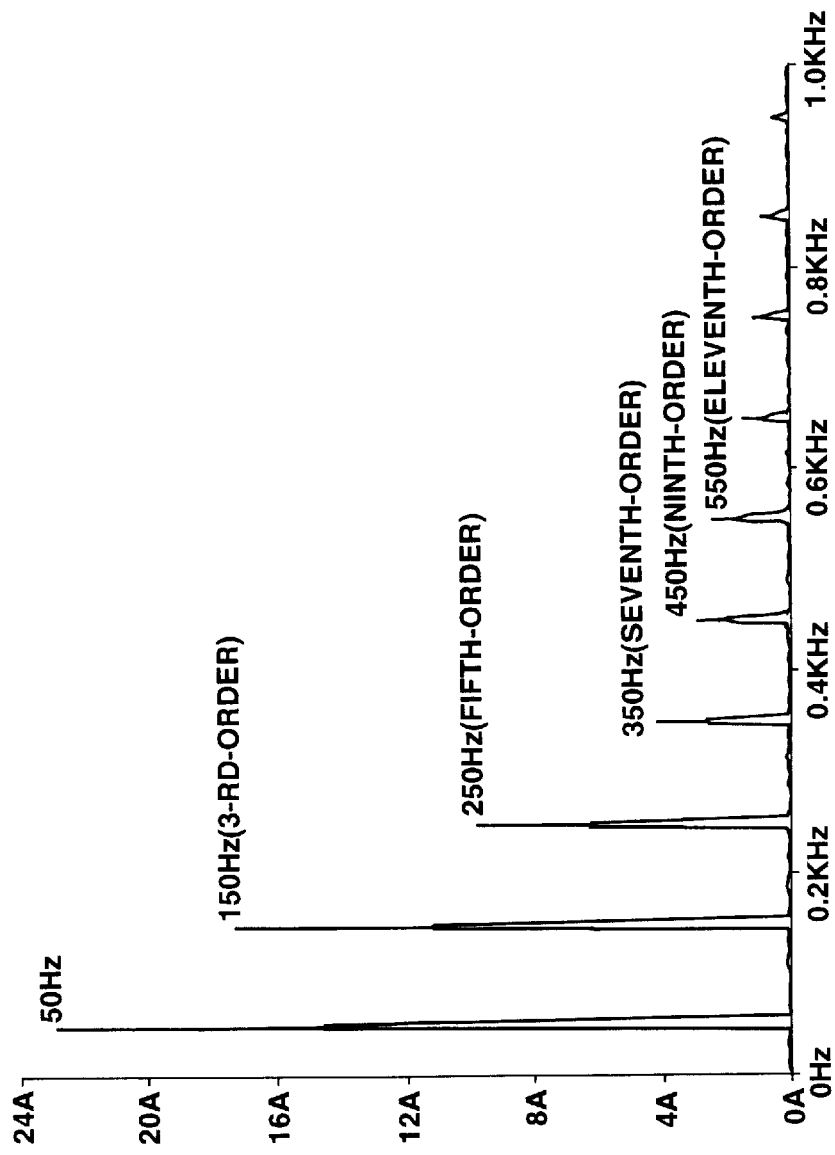
FIG. 46 is a frequency spectrum representing higher harmonics of the input current.
Figure 47:
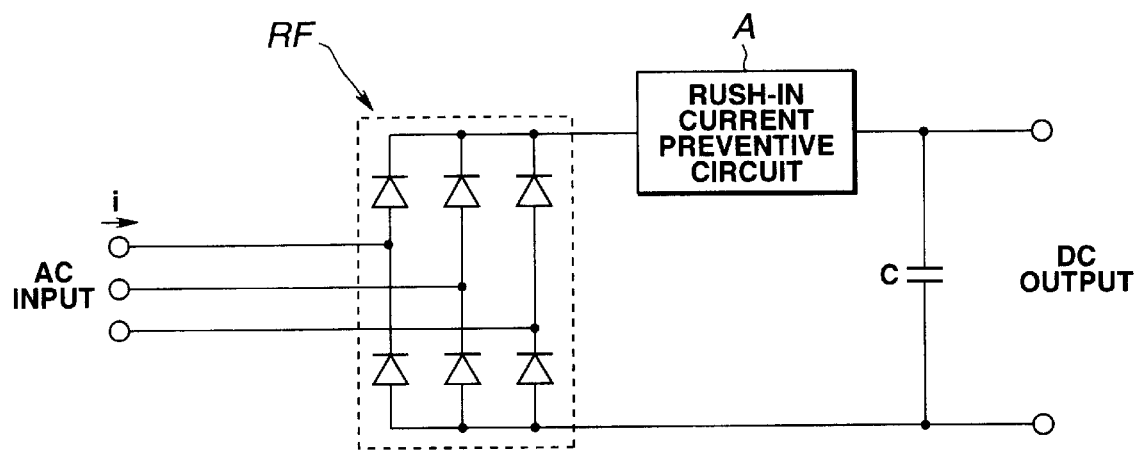
FIG. 47 is a circuit wiring diagram representing another rectifier and smoother in a conventional converter as a conventional example 2.
Figure 48:
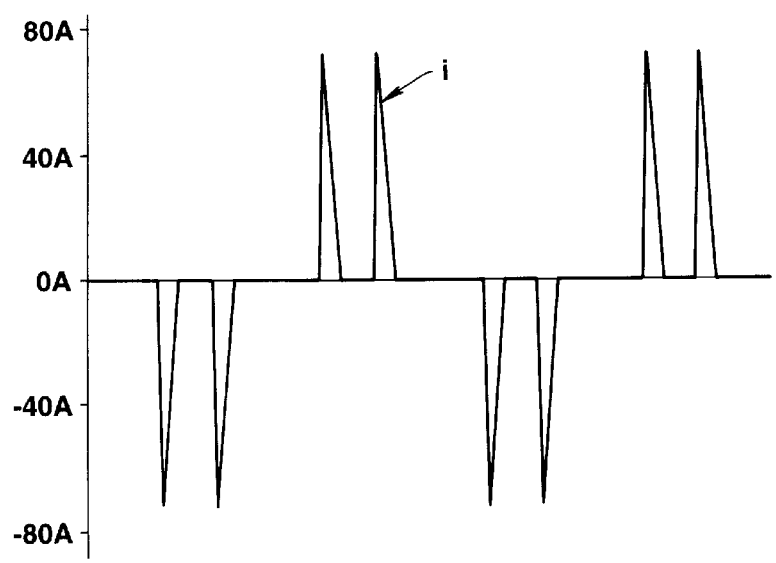
FIG. 48 is a waveform chart of an input current of the converter.
Figure 49:
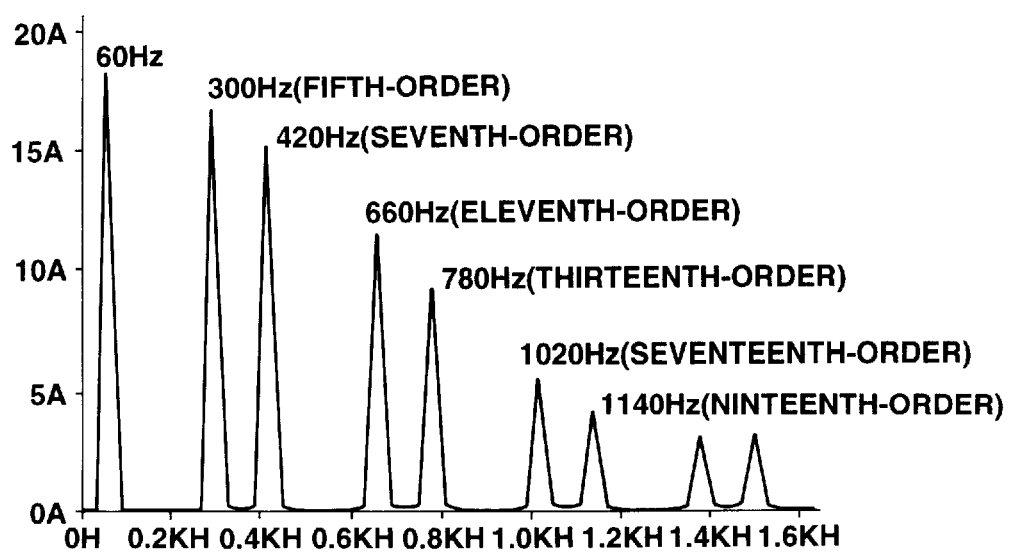
FIG. 49 is a frequency spectrum representing higher harmonics of the input current shown in FIG. 48.
Figure 50:
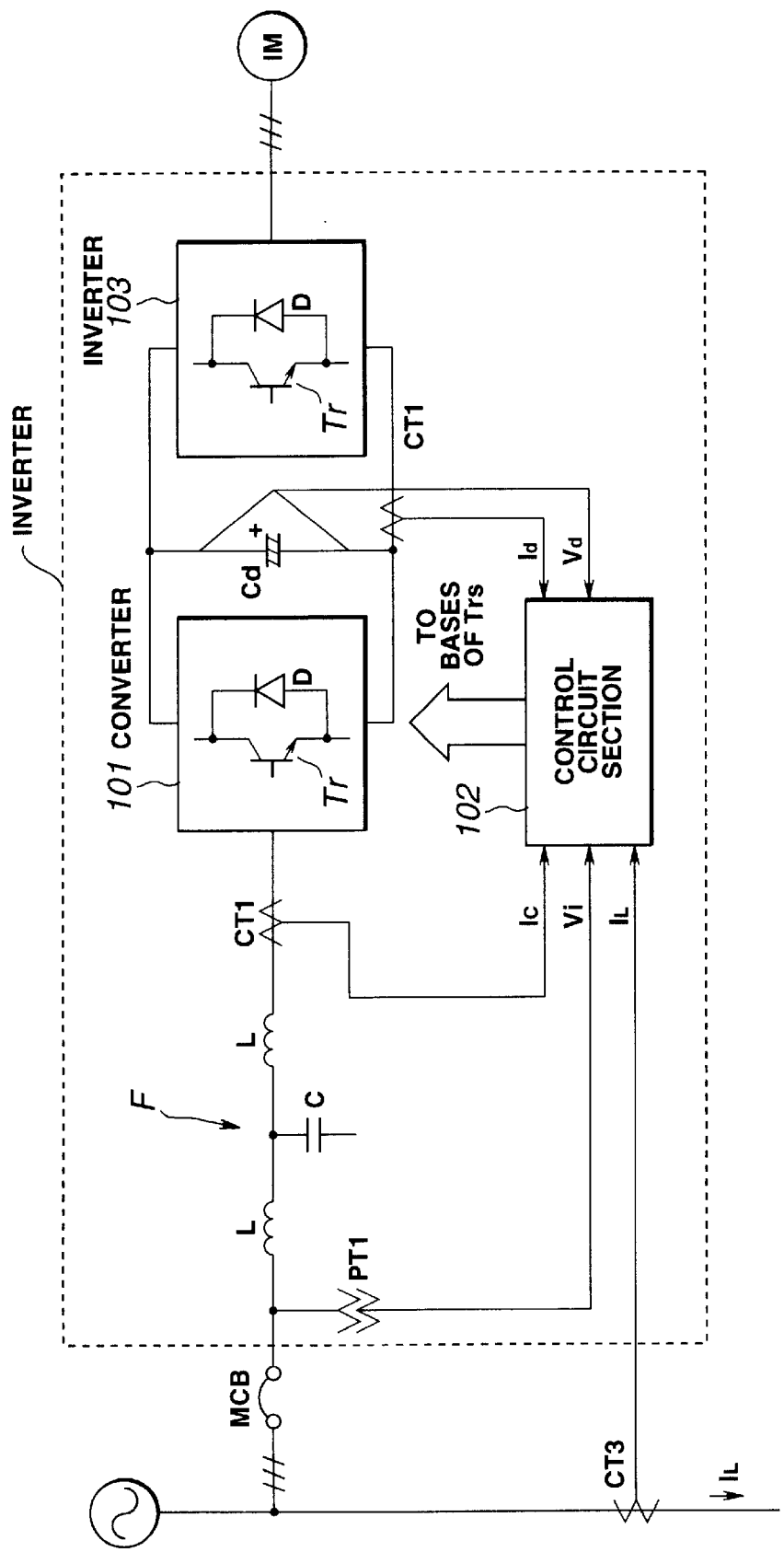
FIG. 50 is a circuit block diagram of a conventional converter as a conventional example 3.

FIG. 43 shows the converter of the single-phase sinusoidal wave converter of the resonance type.

The circuit shown in FIG. 43 is different from the three-phase converter shown in FIG. 39 in that the input filter F and the rectifier 1 of the diode bridge are for the single-phase purpose. The other structure is the same as that in FIG. 39. Hence, the basic operations of the converter shown in FIG. 43 are the same as those shown in FIG. 39 and their operations thereof will be omitted.

It is noted that the IGBT switching element $S_1$ in the fourth to fifteenth embodiments can be replaced with another switching element such as the transistor or MOSFET (Metal Oxide Semiconductor Field Effect Transistor).

As described hereinabove, the converter according to the present invention has the following advantages:

(1) Since the input waveform provides the sinusoidal waveform, the current having the lower-order higher harmonics can be suppressed.

(2) Since the switching element can be controlled in a simple comparator system having the constant carrier wave frequency, the circuit structure of the converter does not become complex.

(3) Since the switching circuit can be multiplexed, the higher harmonics of the switching frequency components can be suppressed.

(4) The detection circuitry can be only the detection of the direct current output voltage.

The particular advantages in the fourth to fifteenth embodiments are described below:

(5) The sinusoidal wave inputted converter can be achieved with the same circuit structure except the input filter F and the rectifier 1 of the diode bridge for the single-phase and three-phase purposes. Hence, the controller has the same structure and the controller can become common.

(6) Since the operations of the switching elements are ZVS and ZCS forms, almost no switching loss occurs. Hence, the highly efficient converter can be achieved.

(7) Since the peak voltage such as to exceed 600 volts for 200 volt system power supply to exceed 1200 volts for 400 volt system power supply is not applied to the switching element, no loss of a cost effectiveness occurs.

Industrial Applicability

As described hereinabove, the sinusoidal wave inputted converter according to the present invention provides the input current waveform of the sinusoidal wave so that the lower-order higher harmonic current can be suppressed. No influence on the alternating current system is given and the converter according to the present invention may be applied to the power rectifier or the converter.

We claim:

1. A single-phase sinusoidal wave inputted converter comprising: a full-wave rectifier of a diode bridge: a single-phase sinusoidal wave AC power supply; an input filter including an inductor connected between one input end of the single-phase sinusoidal wave AC power supply and one input end of the full-wave rectifier diode bridge and a capacitor connected between the one input end of the full wave rectifier diode bridge and the other input end of the full wave rectifier diode bridge; a transistor circuit having a switching element and a reactor connected in series with the switching element, one end of the reactor being connected to one output end of the full-wave rectifier of the diode bridge and one end of the switching element being connected to the other output end of said full-wave rectifier of the diode bridge; a reverse current flow blocking diode arranged for passing only an energy stored in said reactor; a smoothing capacitor across of which the energy stored in said reactor is charged via said reverse current flow blocking diode; a control circuit having a reference voltage power supply, an amplifier arranged for amplifying a deviation between a voltage across the smoothing capacitor and the reference voltage, a carrier wave generator for independently generating a triangular carrier wave, and a comparator arranged for comparing the amplified deviation with the triangular carrier wave so that a turn on or off of said switching element is controlled according to a result of the comparison by the comparator.

2. A single-phase sinusoidal wave inputted converter comprising: a full-wave rectifier of a diode bridge: a single-phase sinusoidal wave AC power supply; an input filter including an inductor connected between one input end of the single-phase sinusoidal wave AC power supply and one input end of the full-wave rectifier diode bridge and a capacitor connected between the one input end of the full-wave rectifier diode bridge and the other input end of the full-wave rectifier divide bridge; a transistor circuit pair having a switching element pair and a reactor pair, each one end of the switching element pair being connected to one end of the rectifier of the diode bridge, each other end of the switching element pair being connected to the corresponding one end of the reactor pair, and each of the other pair being connected to the other end of the full-wave rectifier of the diode bridge; reverse-current flow blocking diode pair arranged for passing only energies stored in the reactor pair; a smoothing capacitor across of which the energies stored in the reactor pair are charged via said reverse-current flow blocking diodes; a control circuit having a reference voltage generator for generating a reference voltage, an amplifier for amplifying a deviation between the reference voltage and a voltage across the smoothing capacitor, a triangular carrier wave generator pair arranged for generating a triangular carrier wave pair having a phase difference of 180°, and a comparator pair for comparing the amplified deviation signal of the amplifier with the triangular carrier waves so that a turn on and off of each switching element is controlled according to the result of each comparison by the comparator pair.

3. A three-phase sinusoidal wave inputted converter comprising: a three-phase half-wave rectifier having a rectifying diode of each phase; a three-phase sinusoidal wave AC power supply; an input filter including inductors, each connected between an input end of each phase of the AC power supply and an input end of each phase of the rectifying diode of the three-phase half-wave rectifier, and capacitors, each connected at one end to a phase output end of the corresponding one of the inductors, the capacitors having another end connected to each other; a first reactor connected in series with the corresponding one of the three-phase half-wave rectifier diode; serial circuits each having a second reactor and a switching element and each being connected between an output terminal of the three-phase half-wave rectifier and an input end of each half-wave rectifier, reverse-current flow blocking diodes for passing energies stored in the first and second reactors; a smoothing capacitor across of which the energies stored in said first and second reactors are charged via the respective reverse-current flow blocking diodes; a reference voltage generator for generating a reference voltage; an amplifier for amplifying a deviation between the reference voltage and a voltage across the smoothing capacitor; a comparator for comparing the amplified deviation signal of the amplifier with a triangular carrier wave independently generated by a triangular carrier wave generator so that a turn on and off of each switching element is controlled according to a result of the comparison by the comparator.

4. A resonance-type sinusoidal wave inputted converter comprising: a half-wave rectifier diode bridge; a three-phase sinusoidal wave AC power supply; an input filter including first inductors, each first inductor being connected to an input end of each phase of the AC power supply, the input filter including second inductors, each second inductor being connected in series with the corresponding phase first inductor, and the input filter including capacitors, each capacitor being connected at one end between the corresponding phase first inductor and the corresponding phase second inductor, each capacitor being connected at the other end to each other; a self arc extinguishing type switching element connected between output terminals of the rectifier of the diode bridge; a serial circuit having a capacitor and a thyristor connected across output terminals of the rectifier of the diode bridge; a rectifier having a diode arranged for rectifying a terminal voltage across said capacitor and a smoother arranged for smoothing the rectifier output; and a control circuit arranged for outputting a first gate signal to a gate of said switching element at a frequency sufficiently higher than a power supply frequency of the three-phase sinusoidal wave AC power supply and outputting a second gate signal to a gate of said thyristor at a timing of the output of the first gate signal to the gate of the switching element delayed by a predetermined time lag.

5. A resonance-type sinusoidal wave inputted converter as claimed in claim 4, wherein a second diode is connected in parallel to said capacitor so as to charge said capacitor.

6. A resonance-type sinusoidal wave inputted converter comprising: a rectifier diode bridge; a three-phase or single phase sinusoidal wave AC power supply; an input filter interposed between the AC power supply and the rectifier diode bridge and including at least one first inductor connected to an input end of the AC power supply, at least one second inductor connected in series with the first inductor, and at least one capacitor connected between another input end of the AC power supply and a connected part between the first and second inductors; a first switching element of a self arc extinguishing type connected between output terminals of the rectifier of the diode bridge; a serial circuit having a capacitor and a second switching element of a self arc extinguishing type connected across output terminals of the rectifier of the diode bridge; a rectifier having a diode arranged for rectifying a terminal voltage across the capacitor and a smoother arranged for smoothing a rectified output of the diode thereof; a current detector arranged for detecting a current flowing through said second switching element; and a control circuit arranged for intermittently turning on said first switching element using a gate signal generated therefrom to a gate of said first switching element, for turning on the second switching element at a timing of the outputted gate signal to the first switching element delayed by a predetermined time, and turning off the second switching element at a time of a detected current of zero of the current detector.

7. A resonance-type sinusoidal wave inputted converter as claimed in claim 6, wherein a second diode is connected in parallel to said capacitor so as to charge said capacitor.

8. A resonance-type sinusoidal wave inputted converter comprising: a rectifier diode bridge; a three-phase or single phase sinusoidal wave AC power supply; an input filter interposed between the AC power supply and the rectifier diode bridge and including at least one first inductor connected to an input end of the AC power supply, at least one second inductor connected in series with the first inductor, and at least one capacitor connected between a connected part between the first and second inductors and another input end of the AC power supply; a first switching element of a self arc extinguishing type connected between output terminals of the rectifier of the diode bridge; a serial circuit having a capacitor and a second switching element of the self arc extinguishing type connected between output terminals of the rectifier of the diode bridge; a diode arranged for rectifying the terminal voltage across said capacitor; a rectifier having a diode arranged for rectifying the terminal voltage across said capacitor and a smoother arranged for smoothing a rectified output of said diode thereof; and a control circuit arranged for turning on said first switching element intermittently using a first gate signal outputted therefrom to a gate of said first switching element and for turning on said second switching element using a second gate signal which is turned to ON while the first gate signal is turned to OFF and which is turned to OFF at a time delayed by a predetermined time when the first gate signal is turned to OFF.

9. A resonance-type sinusoidal wave inputted converter as claimed in claim 8, wherein a circuit constant of said input filter is selected such that a charge of said capacitor is completed during an off state of said second gate signal.

10. A resonance-type sinusoidal wave inputted converter as claimed in claim 8, wherein a second diode is connected in parallel to said capacitor so as to charge said capacitor.

11. A resonance-type sinusoidal wave inputted converter comprising: a rectifier diode bridge; a three-phase or single phase sinusoidal wave AC power supply; an input filter interposed between the AC power supply and the rectifier diode bridge and including at least one first inductor connected to an input end of the AC power supply, at least one second inductor connected in series with the first inductor, and at least one capacitor connected between a connected part between the first and second inductors and another input end of the AC power supply; a serial circuit having first, second, and third switching elements of self arc extinguishing types connected between output terminals of the rectifier of the diode bridge; a serial circuit having first and second capacitors connected in parallel to the first and second switching elements, respectively; a diode arranged for rectifying terminal voltages of the series connected first and second capacitors; a smoother arranged for smoothing the rectified output of the diode; and a control circuit arranged for turning on intermittently the first and second switching elements using a first gate signal, turning on the third switching element using a first gate signal, turning on the third switching element using a second gate signal which is turned on at the same time when the first gate signal is turned on at the same time when the first gate signal is turned on and turning off the third switching element using the second gate signal which is turned off at a time delayed by a predetermined time after the first gate signal is turned off.

12. A resonance-type sinusoidal wave inputted converter as claimed in claim 11, wherein a circuit constant of said input filter is selected such that a charge of said capacitor is completed during an off state of said second gate signal.

13. A resonance-type sinusoidal wave inputted converter comprising: a rectifier diode bridge; a three-phase or single phase sinusoidal wave AC power supply; an input filter interposed between the AC power supply and the rectifier diode bridge and including at least one first inductor connected to an input end of the AC power supply, at least one second inductor connected in series with the first inductor, and at least one capacitor connected between a connected part between the first and second inductors and another input end of the AC power supply; a serial circuit having first and second switching elements of self arc extinguishing types connected across an output terminal of the rectifier of the diode bridge; a serial circuit having first and second capacitors connected between output terminals of the rectifier of the diode bridge; a circuit arranged for connecting the first capacitor and the first switching element in parallel to each other; a diode arranged for rectifying a terminal voltage of the series-connected first and second capacitors; a smoother arranged for smoothing a rectified output of the diode; and a control circuit arranged for turning on intermittently the first and second switching elements using a first gate signal, turning on said third switching element using a second gate signal which is turned on while the first gate signal is turned on and thereafter turned off and which is turned off at a time delayed by a predetermined time after the first gate signal is turned off.

14. A resonance-type sinusoidal wave inputted converter as claimed in claim 13, wherein a circuit constant of said input filter is selected such that a charge of said capacitor is completed during an off state of said second gate signal.

15. A resonance-type sinusoidal wave inputted converter as claimed in claim 13, wherein a second diode is connected in parallel to said capacitor so as to charge said capacitor.

16. A resonance-type sinusoidal wave inputted converter comprising: a rectifier diode bridge; a three-phase or single phase sinusoidal wave AC power supply; an input filter interposed between the AC power supply and the rectifier diode bridge and including at least one first inductor connected to an input end of the AC power supply, at least one second inductor connected in series with the first inductor, and at least one capacitor connected between a connected part between the first and second inductors and another input end of the AC power supply; a first switching element of a self arc extinguishing type connected between output terminals of the rectifier of the diode bridge; a capacitor charged via a diode according to an output terminal voltage across the rectifier of the diode bridge; a second switching element of a self arc extinguishing type which outputs intermittently the voltage across said capacitor; a smoother arranged for smoothing an intermittent voltage from said second switching element; a circuit arranged for receiving a difference signal between an instruction value of the output voltage of the smoother output voltage and for controlling a duty ratio of a gate signal to be supplied to the first switching element; and a window type comparator arranged for receiving a difference signal between a target value of the capacitor and detected value of the capacitor and for outputting a gate signal to the second switching element.

* * * * *